(12) United States Patent
Li et al.

(10) Patent No.: US 11,999,658 B2
(45) Date of Patent: Jun. 4, 2024

(54) HIGH SALT GYPSUM WALLBOARD CONTAINING SALT ABSORBENTS AND METHODS OF MAKING SAME

(71) Applicant: UNITED STATES GYPSUM COMPANY, Chicago, IL (US)

(72) Inventors: Qinghua Li, Rolling Meadows, IL (US); Mark Hemphill, Hawthorn Woods, IL (US)

(73) Assignee: UNITED STATES GYPSUM COMPANY, Chicago, IL (US)

( * ) Notice: Subject to any disclaimer, the term of this patent is extended or adjusted under 35 U.S.C. 154(b) by 0 days.

(21) Appl. No.: 17/851,709

(22) Filed: Jun. 28, 2022

(65) Prior Publication Data

US 2023/0150879 A1 May 18, 2023

Related U.S. Application Data

(60) Provisional application No. 63/279,869, filed on Nov. 16, 2021.

(51) Int. Cl.
 *C04B 28/14* (2006.01)
 *B28B 19/00* (2006.01)
 (Continued)

(52) U.S. Cl.
 CPC .......... *C04B 28/14* (2013.01); *B28B 19/0092* (2013.01); *B32B 5/022* (2013.01); *B32B 5/18* (2013.01); *B32B 5/245* (2013.01); *B32B 7/02* (2013.01); *B32B 13/045* (2013.01); *B32B 13/08* (2013.01); *B32B 29/007* (2013.01); *B32B 37/15* (2013.01); *B32B 38/0004* (2013.01); *B32B 38/164* (2013.01); *C04B 11/266* (2013.01); *C04B 14/047* (2013.01);
 (Continued)

(58) Field of Classification Search
 CPC ............ C04B 28/14; C04B 2103/0078; C04B 11/266; C04B 18/0445; C04B 18/064; C04B 18/065
 See application file for complete search history.

(56) References Cited

U.S. PATENT DOCUMENTS 5,344,490 A 9/1994 Roosen
5,643,510 A 7/1997 Sucech
(Continued)

FOREIGN PATENT DOCUMENTS

CN 105328943 B 8/2018
CN 111606657 A 9/2020
(Continued)

OTHER PUBLICATIONS

WO 2020224120A1 English translation (Espacenet) (Year: 2020).*
(Continued)

*Primary Examiner* — Jasper Saberi
(74) *Attorney, Agent, or Firm* — Vorys, Sater, Seymour and Pease LLP; Pradip Sahu; Philip T. Petti

(57) ABSTRACT

A gypsum wallboard having a core with a central core layer and one or more densified layers is disclosed. At least one densified layer contains salt absorbent particles of zeolite and/or hydrotalcite to improve adhesion of the gypsum core to a cover sheet. Also, methods of making the gypsum wallboard and a wall system for employing the gypsum wallboard are disclosed.

20 Claims, 3 Drawing Sheets

(51) Int. Cl.

| | |
|---|---|
| *B32B 5/02* | (2006.01) |
| *B32B 5/18* | (2006.01) |
| *B32B 5/24* | (2006.01) |
| *B32B 7/02* | (2019.01) |
| *B32B 13/04* | (2006.01) |
| *B32B 13/08* | (2006.01) |
| *B32B 29/00* | (2006.01) |
| *B32B 37/15* | (2006.01) |
| *B32B 38/00* | (2006.01) |
| *C04B 11/26* | (2006.01) |
| *C04B 14/04* | (2006.01) |
| *C04B 18/04* | (2006.01) |
| *C04B 18/06* | (2006.01) |
| *C04B 22/00* | (2006.01) |
| *C04B 22/06* | (2006.01) |
| *C04B 22/10* | (2006.01) |
| *C04B 22/16* | (2006.01) |
| *C04B 103/00* | (2006.01) |
| *C04B 111/00* | (2006.01) |

(52) U.S. Cl.
CPC ........ *C04B 18/0445* (2013.01); *C04B 18/064* (2013.01); *C04B 18/065* (2013.01); *C04B 22/0093* (2013.01); *C04B 22/064* (2013.01); *C04B 22/10* (2013.01); *C04B 22/16* (2013.01); *B32B 2038/0084* (2013.01); *B32B 2250/40* (2013.01); *B32B 2262/101* (2013.01); *B32B 2264/10* (2013.01); *B32B 2264/30* (2020.08); *B32B 2266/049* (2016.11); *B32B 2305/022* (2013.01); *B32B 2307/72* (2013.01); *B32B 2307/732* (2013.01); *B32B 2309/02* (2013.01); *B32B 2315/00* (2013.01); *B32B 2315/085* (2013.01); *B32B 2317/12* (2013.01); *B32B 2607/00* (2013.01); *C04B 2103/0078* (2013.01); *C04B 2111/00629* (2013.01)

(56) References Cited

U.S. PATENT DOCUMENTS

| | | | |
|---|---|---|---|
| 5,683,635 | A | 11/1997 | Sucech et al. |
| 6,190,440 | B1 | 2/2001 | Purnell |
| 6,342,284 | B1 | 1/2002 | Yu et al. |
| 6,494,609 | B1 | 12/2002 | Wittbold et al. |
| 6,632,550 | B1 | 10/2003 | Yu et al. |
| 6,815,049 | B2 | 11/2004 | Veeramasuneni et al. |
| 6,822,033 | B2 | 11/2004 | Yu et al. |
| 6,874,930 | B2 | 4/2005 | Wittbold et al. |
| 7,364,676 | B2 | 4/2008 | Sucech et al. |
| 7,534,485 | B2 | 5/2009 | Yamaguchi et al. |
| 7,641,764 | B2 | 1/2010 | Yoshida et al. |
| 7,645,527 | B2 | 1/2010 | Hummel et al. |
| 8,323,785 | B2 | 12/2012 | Yu et al. |
| 8,962,115 | B2 | 2/2015 | Okabe et al. |
| 9,933,091 | B2 | 4/2018 | Tanaka |
| 10,427,979 | B2 | 10/2019 | Harrison et al. |
| 11,014,066 | B2 | 5/2021 | Caldwell et al. |
| 2003/0010258 | A1 | 1/2003 | Fukuda et al. |
| 2010/0247937 | A1 | 9/2010 | Liu et al. |
| 2012/0168527 | A1 | 7/2012 | Li et al. |
| 2012/0170403 | A1 | 7/2012 | Li et al. |
| 2013/0310488 | A1 | 11/2013 | Zeh et al. |
| 2014/0234560 | A1 | 8/2014 | Miyata et al. |
| 2015/0056404 | A1 | 2/2015 | Sawafta et al. |
| 2016/0288109 | A1* | 10/2016 | Bazer-Bachi ........... C04B 28/14 |
| 2019/0270675 | A1* | 9/2019 | Harrison ................ C04B 28/144 |
| 2020/0055277 | A1* | 2/2020 | Hemphill ................ B32B 29/06 |
| 2020/0055278 | A1 | 2/2020 | Li et al. |
| 2020/0208398 | A1 | 7/2020 | Stav et al. |
| 2020/0392050 | A1 | 12/2020 | Li et al. |
| 2021/0054619 | A1 | 2/2021 | Kenny et al. |

FOREIGN PATENT DOCUMENTS

| | | | |
|---|---|---|---|
| CN | 111606665 | A | 9/2020 |
| CN | 111943624 | A | 11/2020 |
| DE | 202007011817 | U1 | 1/2009 |
| JP | 2001-059281 | A | 3/2001 |
| JP | 6663640 | B2 * | 3/2020 |
| RU | 1997-433441 | A | 2/1997 |
| WO | 2008049473 | A2 | 5/2008 |
| WO | 2020224120 | A1 | 11/2020 |
| WO | WO-2020224120 | A1 * | 11/2020 ............. C04B 20/04 |

OTHER PUBLICATIONS

JP 6663640B2 English translation (Espacenet) (Year: 2020).*
Lauermanova, Hydrotalcites In Construction Materials, Applied Sciences, 10, 07989; doi 10.3390/app10227989; published Nov. 11, 2022.
Hydrotalcite, Wikipedia, URL: <https://en.wikipedia.org/wiki/Hydrotalcite>, retrieved from the Internet Aug. 08, 2021.
ISO 9277:2010(en), Determination of Specific Surface Area of solids by gas adsorption, Abstract (2010).
GA-214-10e, Recommended Levels Of Gypsum Board Finish, Gypsum Association (2010).
Peterson, Kurt, "engineered Gypsum Panels, the Development and Application of Densified Zones at the Paper/Core Interface of Gypsum Panels", Proceedings of Gypsum 2000, 6th Int'l Conference on Natural and Synthetic Gypsum, Toronto, Canada, May 2000, pp. 9-1-9-16.
Burrows, "A Decade's Experience of Gypsum Board Weight Reduction in the U.S.", 14, Internationale Baustoffagung (Weimar, Sep. 20-23, 2000).
International Search Report and Written Opinion, dated Feb. 24, 2023, from Patent Cooperation Treaty Application No. PCT/US2022/079718, filed Nov. 11, 2022.

* cited by examiner

HIGH SALT GYPSUM WALLBOARD CONTAINING SALT ABSORBENTS AND METHODS OF MAKING SAME

This application claims the benefit of U.S. Provisional Application No. 63/279,869 filed Nov. 16, 2021, herein incorporated by reference.

FIELD OF THE INVENTION

The present invention relates to gypsum board formed from synthetic gypsum and other gypsum sources having high chloride salt concentrations by including zeolite and/or hydrotalcite (also known as hydrotalc) as salt absorbent into a densified layer between a gypsum central core and a coversheet of a gypsum wallboard. The addition of the salt absorbent improves the paper-to-core bond, in particular, when high salt gypsum such as flue gas desulfurization gypsum (also known as synthetic gypsum or syngyp) is used as the gypsum source. The present invention also provides a method of preparing the gypsum board with the densified layer including zeolite and/or hydrotalcite (also known as hydrotalc) as salt absorbent to improve adhesion of a gypsum core to the cover sheet relative to a gypsum board without the zeolite and/or hydrotalcite in the densified layer, and a wall system for employing the gypsum board.

BACKGROUND OF THE INVENTION

In the construction of buildings, one of the more common building elements for construction and remodeling is gypsum wallboard, often known as drywall, gypsum boards, gypsum panels, gypsum paneling, and ceiling tiles. In chemical terms, gypsum is calcium sulfate dihydrate ($CaSO_4 \cdot 2H_2O$).

Set gypsum is a well-known material that is used in such products. Panels containing set gypsum are often referred to as gypsum boards, which contain a set gypsum core sandwiched between two cover sheets, particularly paper cover sheets. Such panels are commonly used in drywall construction of the interior walls and ceilings of buildings. One or more denser regions, often referred to as "high density region", "densified layer," "high density layer", or "bonding layer", may be included as layers on either face of the central core layer, usually at an interface (bond surface) between the central core layer and an inner surface of a cover sheet. The denser regions may be contiguous with a less dense region of the gypsum core following setting of the gypsum.

During manufacture of a gypsum board, stucco (containing calcium sulfate hemihydrate), water, and other ingredients as appropriate may be mixed, typically in a mixer to form an aqueous gypsum slurry. The terms of art aqueous gypsum slurry or aqueous slurry or gypsum slurry are typically employed for the slurry both before and after the calcium sulfate hemihydrate converts to calcium sulfate dihydrate. The gypsum slurry is formed and discharged from the mixer onto a moving conveyor carrying a first cover sheet, optionally bearing a densified layer. If present, the densified layer is applied upstream from the location where the gypsum slurry is discharged onto the first cover sheet. After applying the gypsum slurry to the first cover sheet, a second cover sheet, again optionally bearing a densified layer, is applied onto the gypsum slurry to form a sandwich assembly having a desired thickness. A forming plate, roller or the like may aid in setting the desired thickness. The gypsum slurry is then allowed to harden by forming set (i.e., rehydrated) gypsum through a reaction between the calcined gypsum and water to form a matrix of crystalline hydrated gypsum (i.e., calcium sulfate dihydrate, also known as set gypsum). The desired hydration of the calcined gypsum promotes formation of an interlocking matrix of set gypsum crystals, thereby imparting strength to the gypsum board. Heat may be applied (e.g., using a kiln) to drive off the remaining free (i.e., unreacted) water to yield a dry product. Then the set gypsum product is cut to form gypsum boards of desired length.

Gypsum (calcium sulfate dihydrate and any impurities) suitable for use in wallboard may be obtained from both natural and synthetic sources, followed by further processing.

Natural gypsum may be used by calcining its calcium sulfate dihydrate to produce the hemihydrate form. Gypsum from natural sources is a naturally occurring mineral and can be mined in rock form. Naturally occurring gypsum is a mineral that is typically found in old salt-lake beds, volcanic deposits, and clay beds. When it is mined, raw gypsum is generally found in the dihydrate form. Gypsum is also known as calcium sulfate dihydrate, terra alba or landplaster. In gypsum, there are approximately two water molecules of water associated with each molecule of calcium sulfate.

When the calcium sulfate dihydrate is heated sufficiently, in a process called calcining or calcination, the water of hydration is at least partially driven off and there can be formed either calcium sulfate hemihydrate ($CaSO_4 \cdot \frac{1}{2}H_2O$) (typically provided in the material commonly referred to as "stucco") or calcium sulfate anhydrite ($CaSO_4$) depending on the temperature and duration of exposure. As used herein, the terms "stucco" and "calcined gypsum" refer to both the hemihydrate and anhydrite forms of calcium sulfate that may be contained therein. Calcination of the gypsum to produce the hemihydrate form takes place by the following equation:

$$CaSO_4 \cdot 2H_2O \rightarrow CaSO_4 \cdot 0.5H_2O + 1.5H_2O$$

Calcined gypsum is capable of reacting with water to form calcium sulfate dihydrate, which is a rigid product and is referred to herein as "set gypsum."

Gypsum may also be obtained synthetically (referred to as "syngyp", desulphurization gypsum or desulphogypsum or DSG in the art) as a by-product of industrial processes such as flue gas desulfurization from power plants, for example. Natural or synthetic gypsum can be calcined at high temperatures, typically above 150° C., to form stucco (i.e., calcined gypsum in the form of calcium sulfate hemihydrate and/or calcium sulfate anhydrite), which may undergo subsequent rehydration to form set gypsum in a desired shape, such as a board.

Synthetic gypsum obtained from power plants is usually suitable for use in gypsum panels intended for construction projects. In particular, flue gas including sulfur dioxide is wet scrubbed with lime or limestone, which produces calcium sulfite in the following reaction.

$$CaCO_3 + SO_2 \rightarrow CaSO_3 + CO_2$$

The calcium sulfite is then converted to calcium sulfate dihydrate in the following reaction.

$$CaSO_3 + 2H_2O + \tfrac{1}{2}O_2 \rightarrow CaSO_4 \cdot 2H_2O$$

The hemihydrate form may then be produced by calcination in a similar manner to that used for natural gypsum.

However, many conventional coal-fired power plants are being shut down in favor of more environmentally friendly sources of energy. The shutdown of coal-fired power plants has created a growing shortage of synthetic gypsum suitable for producing gypsum panels. Lower quality synthetic gypsum is available from power plants and other sources, but this alternatively sourced gypsum often contains fairly high concentrations of extraneous salts, particularly magnesium or sodium salts, more particularly magnesium chloride and sodium chloride. Small amounts of potassium chloride and calcium chloride may also be present in alternatively sourced synthetic gypsum. The high salt concentrations in the core may result in insufficient adhesion between the core and at least one of the first cover sheet and the second cover sheet. Thus, the extraneous salts can be problematic due to their tendency to decrease adhesion between the board core and the cover sheets, particularly a back paper cover sheet.

US 2020/0055278 to Li et al discloses gypsum boards formed from synthetic gypsum and other gypsum sources having high chloride salt concentrations. Gypsum boards include a board core including set gypsum. A total concentration of the chloride anion in the board core ranges from about 500 ppm to about 3000 ppm, typically about 1000 ppm to about 3000 ppm, based on weight of the calcium sulfate hemihydrate. An inner surface of a front paper cover sheet contacts a first face of the board core. An inner surface of a back paper cover sheet contacts a second face of the board core. A starch layer coats the inner surface of at least one of the front and back cover sheet. Methods of making the gypsum board, and a wall system for employing the gypsum boards, are also provided.

US 2020/0055277 to Hemphill et al discloses gypsum boards formed from synthetic gypsum and other gypsum sources having high chloride salt concentrations. The gypsum boards include a set core between front and back paper cover sheets. The back paper cover sheet has a plurality of perforations extending therethrough. Methods of making the gypsum boards, and a wall system for employing the gypsum boards, are also provided. The concentration of the chloride anion in aqueous gypsum slurry used to make the set core and to perform the methods of the invention may range from about 500 ppm to about 3000 ppm by weight calcium sulfate hemihydrate, typically from about 500 ppm to about 2000 ppm by weight calcium sulfate hemihydrate, more typically from about 500 ppm to about 1500 ppm by weight calcium sulfate hemihydrate.

WO 2020/224120 A1 discloses a high impurity ion content desulfurized gypsum paper-faced gypsum board and a manufacturing method therefor. The paper-faced gypsum board comprises a board core and protective paper outside the board core. Raw materials of the board core comprise 100 parts by weight of a desulfurized gypsum raw material and 0.5-10 parts by weight of zeolite. The desulfurized gypsum raw material is selected from any one or more of a high-sodium desulfurized gypsum raw material, a high-magnesium desulfurized gypsum raw material, a high-potassium desulfurized gypsum raw material, and a high-chlorine desulfurized gypsum raw material. The zeolite is a modified (calcined) zeolite; or, the side of the face paper that is in contact with the plate core has an adsorption material, and the adsorption material is selected from zeolite, diatomaceous earth, fly ash, and attapulgite clay and any one or more of bentonite. An aqueous solution of starch and the adsorption material may be provided in advance on one side of the protective paper in contact with the board core. The desulfurized gypsum having high impurity ion content is used as a raw material of the paper-faced gypsum board. WO 2020/224120 A 1 discloses that the chloride ion content in the high-chloride desulfurization gypsum raw material is w, 421 mg/kg≤w≤8000 mg/kg (421 ppm≤w≤8000 ppm).

CN 111606665 (claiming priority from one of the priority documents of WO 2020/224120 A1) describes a gypsum board core and a cover sheet (protective paper). The board core is prepared from, by mass, 100 parts of desulfurized gypsum raw material, 60-75 parts of water, 0.5-10 parts of zeolite, and 0.2-1 part of starch. CN 111606665 describes a step of spraying a mixed solution of a starch solution and an adsorption material on the protective paper in advance. CN 111606665 discloses in the mixed solution the weight ratio of water, starch and the absorbing material is 100:3-8:1-5. CN 111606665 also discloses the water dosage is not more than 5% of the weight of the desulfurized gypsum raw material. However, this means that the water of the mixed solution is not more than 5% of the weight of the desulfurized gypsum raw material for the gypsum core.

High-salt is especially a problem for employing synthetic gypsum from sources such as waste from power plant flue gas desulfurization systems. It is also a problem for employing gypsum from sources such as certain mines in Australia that contain high levels of salt that must be leached out over several years before being used in gypsum board manufacture.

It will be appreciated that this background description has been created by the inventors to aid the reader, and is neither a reference to prior art nor an indication that any of the indicated problems were themselves appreciated in the art. While the described principles can, in some regards and embodiments, alleviate the problems inherent in other systems, it will be appreciated that the scope of the protected innovation is defined by the attached claims, and not by the ability of the claimed invention to solve any specific problem noted herein.

SUMMARY OF THE INVENTION

The invention provides gypsum boards comprising a gypsum core comprising set gypsum and extraneous salts, particularly chloride salts, and more particularly chloride salts such as NaCl, KCl, $MgCl_2$, $CaCl_2$, and any combination thereof. The gypsum core is disposed between a first cover sheet and a second cover sheet. The invention provides significant adhesion between the core and one or more of the cover sheets, particularly a back cover sheet, even when appreciable quantities of the extraneous salts are present. This improved adhesion between the core and a cover sheet is realized by introducing zeolite and/or hydrotalcite as salt absorbent into a densified layer between the cover sheet, particularly a back cover sheet, and the central gypsum core or central core layer. Thus, the invention adds the absorbent material in either two densified layers or one densified layer. If there is only one densified layer, it is typically on the side of the back cover sheet. Methods for producing the gypsum boards from salt-containing gypsum sources are provided.

In an embodiment, the invention provides a gypsum board comprising:
  a core with a central core layer and a first densified layer, the core having opposed first and second faces, the core comprising set gypsum, the set gypsum comprising calcium sulfate dihydrate;
  a first cover sheet having an outer surface and an inner surface, the first cover sheet inner surface facing the first face of the core, wherein the first cover sheet comprises a first paper cover sheet or a first fiber glass mat;
  a second cover sheet having an outer surface and an inner surface, the second cover sheet inner surface facing the second face of the core, wherein the second cover sheet comprises a second paper cover sheet or a second fiber glass mat;

wherein the core is between the first cover sheet and the second cover sheet;

the first densified layer comprising the set gypsum and salt absorbent particles (preferably said salt absorbent particles are uniformly distributed throughout the first densified layer), said salt absorbent particles comprising salt absorbent material, wherein the salt absorbent material comprises zeolite, or hydrotalcite, or a blend of zeolite and hydrotalcite, wherein the first densified layer is between the central core layer and the second cover sheet, wherein opposing sides of the first densified layer respectively contact the central core layer and the second cover sheet;

wherein the central core layer comprises:
  at least 60 wt. %, preferably at least 70 wt. %, more preferably at least 80 wt. %, typically at least 90 wt. % or typically at least 95 wt. % said calcium sulfate dihydrate, and
  150 to 4000 parts by weight chloride, typically about 300 to about 3000 parts by weight, more typically from about 400 to about 2000 parts by weight, and further typically from about 600 to about 1000 parts by weight, per 1,000,000 parts by weight said calcium sulfate dihydrate;

wherein the first densified layer comprises:
  at least 60 wt. %, preferably at least 70 wt. %, more preferably at least 80 wt. %, typically at least 90 wt. % or typically at least 95 wt. % said calcium sulfate dihydrate,
  150 to 4000 parts by weight chloride, typically about 300 to about 3000 parts by weight, more typically from about 400 to about 2000 parts by weight, and further typically from about 600 to about 1000 parts by weight, per 1,000,000 parts by weight said calcium sulfate dihydrate, and
  the salt absorbent material in an amount of 0.5 to 10 parts by weight, preferably 0.5 to 5 parts by weight, more preferably 1 to 5 parts by weight, furthermore preferably 1 to 3 parts by weight, or 1 to 2 parts by weight, for example 0.5 to 1.5 parts by weight, per 100 parts by weight of the set gypsum of the first densified layer;

wherein parts by weight of salt absorbent material per 100 parts by weight of the set gypsum in the central core layer is relatively less than parts by weight of salt absorbent material per 100 parts by weight of the set gypsum in the first densified layer;

wherein the core has a density of about 15 to 55, preferably about 15 to 40, pounds per cubic foot, wherein the first densified layer has a density at least 1.1 times a density of the central core layer, wherein the first densified layer is thinner than the central core layer, and wherein thickness of the first densified layer is 5% to 25% of thickness of the gypsum board.

The above-mentioned density of the core is overall density of the entire core including the central core layer and any densified layer(s).

A particular embodiment of the invention provides a gypsum board comprising:

a core comprising a central core layer and a first densified layer, the core having opposed first and second faces, the core comprising set gypsum, the set gypsum comprising calcium sulfate dihydrate;

a first cover sheet having an outer surface and an inner surface, the first cover sheet inner surface facing the first face of the core, wherein the first cover sheet comprises a first paper cover sheet or a first fiber glass mat;

a second cover sheet having an outer surface and an inner surface, the second cover sheet inner surface facing the second face of the core, wherein the second cover sheet comprises a second paper cover sheet or a second fiber glass mat;

wherein the core is between the first cover sheet and the second cover sheet;

the first densified layer comprising the set gypsum and salt absorbent particles (preferably said salt absorbent particles are uniformly distributed throughout the first densified layer), said salt absorbent particles comprising salt absorbent material, wherein said salt absorbent material comprises zeolite, or hydrotalcite, or a blend of zeolite and hydrotalcite, wherein the first densified layer is between the central core layer and the second cover sheet, wherein opposing sides of the first densified layer respectively contact the central core layer and the second cover sheet;

wherein the central core layer results from setting of an aqueous central core layer slurry comprising a mixture of stucco and water between the first cover sheet and the second cover sheet, wherein the stucco comprises calcium sulfate hemihydrate and one or more chloride salts;

wherein the aqueous central core layer slurry is made from:
  at least 60 wt. %, preferably at least 70 wt. %, more preferably at least 80 wt. %, typically at least 90 wt. % or typically at least 95 wt. % said calcium sulfate hemihydrate on a dry (water free) basis,
  150 to 4000 parts by weight chloride anion, typically about 300 to about 3000 parts by weight, more typically from about 400 to about 2000 parts by weight, and further typically from about 600 to about 1000 parts by weight, per 1,000,000 parts by weight said calcium sulfate hemihydrate, and
  the water at a weight ratio of the water to the calcium sulfate hemihydrate of 0.2:1 to 1.2:1;

wherein the first densified layer results from setting of an aqueous first densified layer slurry made from the stucco, the salt absorbent particles, and water, wherein the stucco comprises calcium sulfate hemihydrate and one or more chloride salts, and wherein the aqueous first densified layer slurry is made from:
  at least 60 wt. %, preferably at least 70 wt. %, more preferably at least 80 wt. %, typically at least 90 wt. % or typically at least 95 wt. % said calcium sulfate hemihydrate on a dry (water free) basis,
  150 to 4000 parts by weight chloride anion, typically about 300 to about 3000 parts by weight, more typically from about 400 to about 2000 parts by weight, and further typically from about 600 to about 1000 parts by weight, per 1,000,000 parts by weight said calcium sulfate hemihydrate,
  the salt absorbent material in an amount of 0.5 to 10 parts by weight, preferably 0.5 to 5 parts by weight, more preferably 1 to 5 parts by weight, furthermore preferably 1 to 3 parts by weight, or 1 to 2 parts by weight, for example 0.5 to 1.5 parts by weight, per 100 parts by weight of the stucco for the first densified layer slurry; and the water at a weight ratio of water to the calcium sulfate hemihydrate of 0.2:1 to 1.2:1;

wherein parts by weight of said salt absorbent material per 100 parts by weight stucco in the aqueous central core layer slurry is relatively less than parts by weight of said salt absorbent material per 100 parts by weight stucco in the aqueous first densified layer slurry, wherein parts by weight of said salt absorbent material per 100 parts by weight set gypsum in the central core layer is relatively less than parts by weight of said salt absorbent material per 100 parts by weight set gypsum in the first densified layer;

wherein the core has a density of about 15 to 55, preferably about 15 to 40, pounds per cubic foot, wherein the first densified layer has a density at least 1.1 times a density of the central core layer, wherein the first densified layer is thinner than the central core layer, and wherein thickness of the first densified layer is 5% to 25% of thickness of the gypsum board.

Preferably each salt absorbent particle is at least 80 wt. %, more preferably at least 90 wt. %, furthermore preferably at least 95 wt. %, typically at least 98 wt. %, or at least 99 wt. %, zeolite or hydrotalcite. Each salt absorbent particle can be 100 wt. %, zeolite or hydrotalcite. Typically individual particles containing zeolite do not contain hydrotalcite. Typically individual particles containing hydrotalcite do not contain zeolite. The salt absorbent material may comprise or consist of zeolite, or hydrotalcite, or a blend of zeolite and hydrotalcite. The core may have an absence of salt absorbent material other than the zeolite and/or hydrotalcite.

Preferably the salt absorbent particles have a D50 median particle size in a range from 0.1 to 100 micrometers, preferably 0.5 to 50 micrometers. Particle Size Distribution D50 is also known as median diameter or medium value of particle size distribution, it is the value of the particle diameter at 50% in the cumulative distribution. For example, if D50=10 microns, then 50% of the particles in the sample are larger than 10 microns, and 50% are smaller than 10 microns.

Preferably a second densified layer is between the first cover sheet and the central core layer. The second densified layer resulted from setting of an aqueous second densified layer slurry comprising a mixture of stucco and water, wherein the stucco comprises calcium sulfate hemihydrate and one or more chloride salts. Typically the second densified layer has the same density as the first densified layer. The second densified layer may be employed with or without salt absorbent particles, wherein the salt absorbent particles comprise or consist of salt absorbing material that comprises or consists of zeolite, or hydrotalcite, or a blend of zeolite and hydrotalcite. However, preferably the second densified layer is employed with the salt absorbent particles. Typically the second densified layer has the same composition as the first densified layer.

The invention also provides a method for preparing a gypsum board having significant quantities of the one or more extraneous salts in a gypsum core.

The invention providing a method for making a gypsum board having a core, comprising a central core layer and a first densified layer, the core having opposed first and second faces, the core comprising set gypsum, the set gypsum comprising calcium sulfate dihydrate, wherein the core is between a first cover sheet and a second cover sheet, comprising:

preparing an aqueous central core layer slurry comprising a mixture of stucco and water, wherein the stucco comprises calcium sulfate hemihydrate and one or more chloride salts, disposing the aqueous central core layer slurry between the first cover sheet and the second cover sheet, wherein the first cover sheet comprises a first paper cover sheet or a first fiber glass mat, wherein the second cover sheet comprises a second paper cover sheet or a second fiber glass mat, and disposing an aqueous first densified layer slurry comprising a mixture of water and stucco and salt absorbent particles between the second cover sheet and the central core layer to contact the second cover sheet and the central core layer, wherein the salt absorbent particles comprise salt absorbent material, wherein the salt absorbent material comprises zeolite, or hydrotalcite, or a blend of zeolite and hydrotalcite, wherein the stucco comprises calcium sulfate hemihydrate and the one or more chloride salts, wherein preferably the salt absorbent material is uniformly distributed in the aqueous first densified layer slurry, wherein the aqueous central core layer slurry is made from:
at least 60 wt. %, preferably at least 70 wt. %, more preferably at least 80 wt. %, typically at least 90 wt. % or typically at least 95 wt. % said calcium sulfate hemihydrate on a dry (water free) basis,
150 to 4000 parts by weight chloride anion, typically about 300 to about 3000 parts by weight, more typically from about 400 to about 2000 parts by weight, and further typically from about 600 to about 1000 parts by weight, per 1,000,000 parts by weight said calcium sulfate hemihydrate, and
the water at a weight ratio of water to the calcium sulfate hemihydrate of 0.2:1 to 1.2:1; and wherein the aqueous first densified layer slurry is made from:
at least 60 wt. %, preferably at least 70 wt. %, more preferably at least 80 wt. %, typically at least 90 wt. % or typically at least 95 wt. % said calcium sulfate hemihydrate on a dry (water free) basis,
150 to 4000 parts by weight chloride anion, typically about 300 to about 3000 parts by weight, more typically from about 400 to about 2000 parts by weight, and further typically from about 600 to about 1000 parts by weight, per 1,000,000 parts by weight said calcium sulfate hemihydrate,
the salt absorbent material in an amount of 0.5 to 10 parts by weight, preferably 0.5 to 5 parts by weight, more preferably 1 to 5 parts by weight, furthermore preferably 1 to 3 parts by weight, or 1 to 2 parts by weight, for example 0.5 to 1.5 parts by weight, per 100 parts by weight of the stucco for the first densified layer slurry, and
the water at a weight ratio of water to the calcium sulfate hemihydrate of 0.2:1 to 1.2:1;

allowing the aqueous gypsum central core layer slurry to set to form a central core layer comprising calcium sulfate dihydrate, and allowing the aqueous gypsum first densified layer slurry to set to form a first densified layer comprising calcium sulfate dihydrate and the salt absorbent particles, to form a gypsum board preform comprising the central core layer, the first densified layer, the first cover sheet, and the second cover sheet;

cutting the gypsum board preform to produce the gypsum board; and drying the gypsum board;

wherein parts by weight of salt absorbent material per 100 parts by weight stucco in the aqueous central core layer slurry is relatively less than parts by weight of salt absorbent material per 100 parts by weight stucco in the aqueous first densified layer slurry, wherein parts by weight of salt absorbent material per 100 parts by weight set gypsum in the central core layer is relatively less than parts by weight of salt absorbent material per 100 parts by weight set gypsum in the first densified layer;

wherein the aqueous central core layer slurry is less dense than the aqueous first densified layer slurry;

wherein the core has a density of about 15 to 55, preferably about 15 to 40, pounds per cubic foot, wherein the first densified layer has a density at least 1.1 times a density of the central core layer, wherein the first densified layer is thinner than the central core layer, and wherein thickness of the first densified layer is 5% to 25% of thickness of the gypsum board.

If the aqueous first densified layer slurry has a blend of zeolite and hydrotalcite then the total parts by weight of zeolite and hydrotalcite per 100 parts by weight stucco in the aqueous central core layer slurry is relatively less than the total parts by weight of zeolite and hydrotalcite per 100 parts by weight stucco in the aqueous first densified layer slurry. Optionally, if the aqueous first densified layer slurry has a blend of zeolite and hydrotalcite, then the parts by weight of zeolite per 100 parts by weight stucco in the aqueous central core layer slurry is relatively less than the parts by weight of zeolite per 100 parts by weight stucco in the aqueous first densified layer slurry; and the parts by weight of hydrotalcite per 100 parts by weight stucco in the aqueous central core layer slurry is relatively less than the parts by weight of hydrotalcite per 100 parts by weight stucco in the aqueous first densified layer slurry.

If the first densified layer has a blend of zeolite and hydrotalcite then the total parts by weight of zeolite and hydrotalcite per 100 parts by weight set gypsum in the central core layer is relatively less than the total parts by weight of zeolite and hydrotalcite per 100 parts by weight set gypsum in the first densified layer. Optionally, if the first densified layer has a blend of zeolite and hydrotalcite, then the parts by weight of zeolite per 100 parts by weight set gypsum in the central core layer is relatively less than the parts by weight of zeolite per 100 parts by weight set gypsum in the first densified layer; and the parts by weight of hydrotalcite per 100 parts by weight set gypsum in the central core layer is relatively less than the parts by weight of hydrotalcite per 100 parts by weight set gypsum in the first densified layer.

For purposes of this disclosure a dry basis is a water-free basis. For example, a dry wt. % amount of an ingredient of the aqueous slurry is the wt. % of the ingredient based on the dry (water-free) materials of the aqueous slurry. In contrast, a wet basis is a water inclusive basis.

For purposes of this disclosure all average molecular weights, percentages and ratios used herein, are by weight (i.e., wt. %) unless otherwise indicated.

The invention also provides a wall system comprising framing to which is attached at least one gypsum board of the invention, wherein the outer surface of the first cover sheet faces away from the framing. In the wall system, the gypsum board may be on an interior wall or ceiling of a building. Typically, the framing is wood or metal. Typically, the at least one gypsum board is attached to the framing by any one or more of screws, nails, glue, or other mechanical fasteners.

Advantages of the present invention may become apparent to those having ordinary skill in the art from a review of the following detailed description, taken in conjunction with the examples, and the appended claims. It should be noted, however, that while the invention is susceptible of various forms, the present disclosure is intended as illustrative, and is not intended to limit the invention.

DETAILED DESCRIPTION OF THE INVENTION

Figure 1:
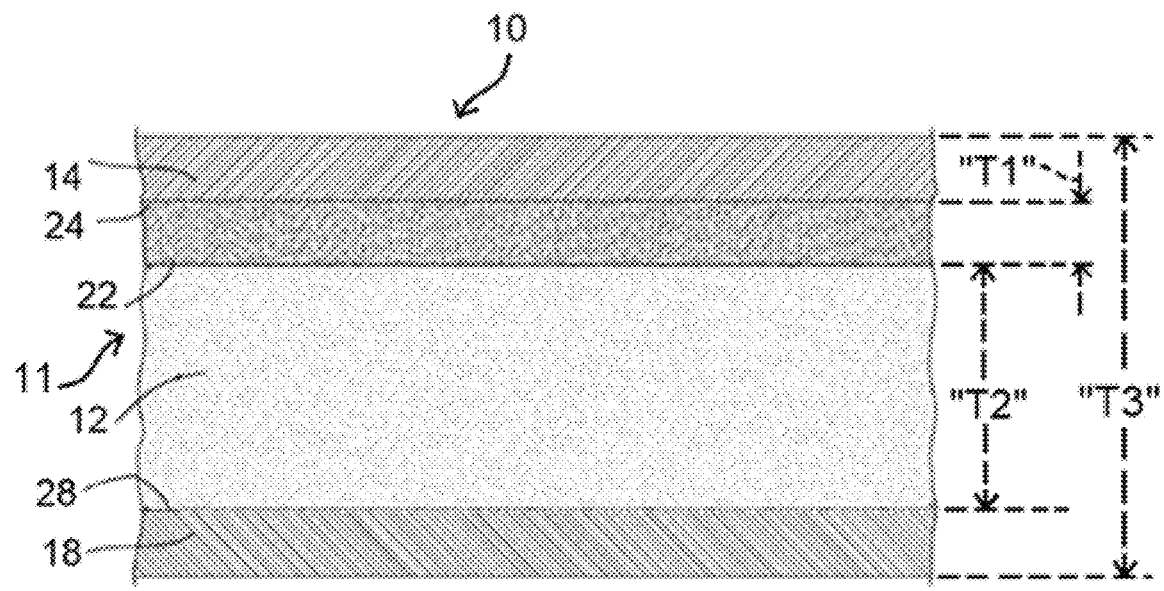
FIG. 1 shows a cross-sectional view of a gypsum board of the invention, in which a first densified layer is between a second cover sheet and a central core layer.

The present invention provides the ability to use gypsum containing relatively high amounts of extraneous salts in the core of a gypsum board. The board has a central core layer, one or two densified layers, and one or two cover sheets. Optionally, various additives may also be present in the central core layer or a gypsum slurry used to form the central core layer as well as in the high-density region (densified layer) or a gypsum slurry used to form the densified layer. In addition to the high-density region (densified layer) in contact with the inner surface of the second (typically back) cover sheet and coated thereon, the board may further comprise a second high-density region (densified layer) in contact with the inner surface of the first (typically front) cover sheet and coated thereon. The one or two densified layers may be in contact with the central core layer which typically has a lower-density than each densified layer. The central core layer and each densified layer may be made from an aqueous slurry of a mixture of water and stucco containing calcium sulfate hemihydrate and high amounts of extraneous salts, particularly chloride salts.

Surprisingly, inclusion of zeolite and/or hydrotalcite (also known as hydrotalc) in only the densified layer may improve adhesion between the core containing high amounts of extraneous salts and the cover sheet(s), relative to a gypsum board which is the same but for lacking zeolite and/or hydrotalcite in only the densified layer. Accordingly, the present invention provides gypsum boards containing significant quantities of extraneous salts in a core and methods for producing such gypsum boards using a gypsum source containing significant quantities of the extraneous salts. Thus, the invention may allow lower quality gypsum sources containing excessive extraneous salts, particularly chloride salts, to be used in forming the gypsum board. Such gypsum sources may otherwise be unsuitable for forming a gypsum board with sufficient adhesion between the core and the cover sheets. Advantageously, the present invention addresses this issue Gypsum Board Thus, the invention provides a gypsum board comprising:
a core with a central core layer and a first densified layer, the core having opposed first and second faces, the core comprising set gypsum, the set gypsum comprising calcium sulfate dihydrate;
a first cover sheet having an outer surface and an inner surface, the first cover sheet inner surface facing the first face of the core, wherein the first cover sheet comprises a first paper cover sheet or a first fiber glass mat;
a second cover sheet having an outer surface and an inner surface, the second cover sheet inner surface facing the second face of the core, wherein the second cover sheet comprises a second paper cover sheet or a second fiber glass mat;
wherein the core is between the first cover sheet and the second cover sheet;
the first densified layer comprising the set gypsum and salt absorbent particles (preferably said salt absorbent particles are uniformly distributed throughout the first densified layer), said salt absorbent particles comprising salt absorbent material, wherein the salt absorbent material comprises zeolite, or hydrotalcite, or a blend of zeolite and hydrotalcite, wherein the first densified layer is between the central core layer and the second cover sheet, wherein opposing sides of the first densified layer respectively contact the central core layer and the second cover sheet;
wherein the central core layer comprises:
at least 60 wt. %, preferably at least 70 wt. %, more preferably at least 80 wt. %, typically at least 90 wt. % or typically at least 95 wt. % said calcium sulfate dihydrate, and
150 to 4000 parts by weight chloride, typically about 300 to about 3000 parts by weight, more typically from about 400 to about 2000 parts by weight, and further typically from about 600 to about 1000 parts by weight, per 1,000,000 parts by weight said calcium sulfate dihydrate;
wherein the first densified layer comprises:
at least 60 wt. %, preferably at least 70 wt. %, more preferably at least 80 wt. %, typically at least 90 wt. % or typically at least 95 wt. % said calcium sulfate dihydrate,
150 to 4000 parts by weight chloride, typically about 300 to about 3000 parts by weight, more typically from about 400 to about 2000 parts by weight, and further typically from about 600 to about 1000 parts by weight, per 1,000,000 parts by weight said calcium sulfate dihydrate, and
the salt absorbent material in an amount of 0.5 to 10 parts by weight, preferably 1 to 5 parts by weight, more preferably 1 to 3 parts by weight, per 100 parts by weight of the set gypsum of the first densified layer;
wherein parts by weight of salt absorbent material per 100 parts by weight of the set gypsum in the central core layer is relatively less than parts by weight of salt absorbent material per 100 parts by weight of the set gypsum in the first densified layer;
wherein the core has a density of about 15 to 55, preferably about 15 to 40, pounds per cubic foot,
wherein the first densified layer has a density at least 1.1 times a density of the central core layer,
wherein the first densified layer is thinner than the central core layer, and
wherein thickness of the first densified layer is 5% to 25% of thickness of the gypsum board.

A gypsum board of the invention, described in terms of the slurries that set to make the gypsum board, comprises:
a core comprising a central core layer and a first densified layer, the core having opposed first and second faces, the core comprising set gypsum, the set gypsum comprising calcium sulfate dihydrate;
a first cover sheet having an outer surface and an inner surface, the first cover sheet inner surface facing the first face of the core, wherein the first cover sheet comprises a first paper cover sheet or a first fiber glass mat;
a second cover sheet having an outer surface and an inner surface, the second cover sheet inner surface facing the second face of the core, wherein the second cover sheet comprises a second paper cover sheet or a second fiber glass mat;
wherein the core is between the first cover sheet and the second cover sheet;
the first densified layer comprising the set gypsum and salt absorbent particles (preferably said salt absorbent particles are uniformly distributed throughout the first densified layer), said salt absorbent particles comprising salt absorbent material, wherein said salt absorbent material comprises zeolite, or hydrotalcite, or a blend of zeolite and hydrotalcite, wherein the first densified layer is between the central core layer and the second cover sheet, wherein opposing sides of the first densified layer respectively contact the central core layer and the second cover sheet;
wherein the central core layer results from setting of an aqueous central core layer slurry comprising a mixture of stucco and water between the first cover sheet and the second cover sheet, wherein the stucco comprises calcium sulfate hemihydrate and one or more chloride salts;
wherein the aqueous central core layer slurry is made from:
at least 60 wt. %, preferably at least 70 wt. %, more preferably at least 80 wt. %, typically at least 90 wt. % or typically at least 95 wt. % said calcium sulfate hemihydrate on a dry (water free) basis,
150 to 4000 parts by weight chloride anion, typically about 300 to about 3000 parts by weight, more typically from about 400 to about 2000 parts by weight, and further typically from about 600 to about 1000 parts by weight, per 1,000,000 parts by weight said calcium sulfate hemihydrate, and
the water at a weight ratio of the water to the calcium sulfate hemihydrate of 0.2:1 to 1.2:1;
wherein the first densified layer results from setting of an aqueous first densified layer slurry made from the stucco, the salt absorbent particles, and water, wherein the stucco comprises calcium sulfate hemihydrate and one or more chloride salts, and
wherein the aqueous first densified layer slurry is made from:
at least 60 wt. %, preferably at least 70 wt. %, more preferably at least 80 wt. %, typically at least 90 wt. % or typically at least 95 wt. % said calcium sulfate hemihydrate on a dry (water free) basis, 150 to 4000 parts by weight chloride anion, typically about 300 to about 3000 parts by weight, more typically from about 400 to about 2000 parts by weight, and further typically from about 600 to about 1000 parts by weight, per 1,000,000 parts by weight said calcium sulfate hemihydrate, the salt absorbent material in an amount of 0.5 to 10 parts by weight, preferably 1 to 5 parts by weight, more preferably 1 to 3 parts by weight, per 100 parts by weight of the stucco for the first densified layer slurry; and the water at a weight ratio of water to the calcium sulfate hemihydrate of 0.2:1 to 1.2:1;

wherein parts by weight of said salt absorbent material per 100 parts by weight stucco in the aqueous central core layer slurry is relatively less than parts by weight of said salt absorbent material per 100 parts by weight stucco in the aqueous first densified layer slurry, wherein parts by weight of said salt absorbent material per 100 parts by weight set gypsum in the central core layer is relatively less than parts by weight of said salt absorbent material per 100 parts by weight set gypsum in the first densified layer;

wherein the core has a density of about 15 to 55, preferably about 15 to 40, pounds per cubic foot, wherein the first densified layer has a density at least 1.1 times a density of the central core layer, wherein the first densified layer is thinner than the central core layer, and wherein thickness of the first densified layer is 5% to 25% of thickness of the gypsum board.

The parts by weight of absorbent material comprising zeolite, or hydrotalcite, or a blend of zeolite and hydrotalcite per 100 parts by weight of the set gypsum in the central core layer is relatively less than the parts by weight of absorbent material comprising zeolite, or hydrotalcite, or a blend of zeolite and hydrotalcite per 100 parts by weight of the set gypsum in the first densified layer. For example, if the first densified layer has 0.5 parts by weight of zeolite and/or hydrotalcite per 100 parts by weight of the set gypsum then the central core layer may have 0.3 parts by weight of zeolite and/or hydrotalcite per 100 parts by weight of the set gypsum. Preferably, if a second densified layer is present, the parts by weight of absorbent material comprising zeolite, or hydrotalcite, or a blend of zeolite and hydrotalcite per 100 parts by weight of the set gypsum in the central core layer is also relatively less than the parts by weight of absorbent material comprising zeolite, or hydrotalcite, or a blend of zeolite and hydrotalcite per 100 parts by weight of the set gypsum in the second densified layer.

Typically the central core layer has 0 to less than 0.5 parts by weight, more typically 0 to 0.4 parts by weight, further typically 0 to 0.3 parts by weight, preferably 0 to 0.2 parts by weight, more preferably 0 to 0.1 parts by weight, furthermore preferably 0 to 0.05 parts by weight, or 0 to 0.01 parts by weight, or 0 parts by weight parts by weight, absorbent material comprising zeolite, or hydrotalcite, or a blend of zeolite and hydrotalcite, per 100 parts by weight of the set gypsum of the central core layer.

Preferably the aqueous central core layer slurry has 0 to less than 0.5 parts by weight, more typically 0 to 0.4 parts by weight, further typically 0 to 0.3 parts by weight, preferably 0 to 0.2 parts by weight, more preferably 0 to 0.1 parts by weight, furthermore preferably 0 to 0.05 parts by weight, or 0 to 0.01 parts by weight, or 0 parts by weight parts by weight, absorbent material comprising zeolite, or hydrotalcite, or a blend of zeolite and hydrotalcite, per 100 parts by weight of the set stucco of the aqueous central core layer slurry.

The central core layer and the aqueous gypsum slurry for the central core layer preferably has a substantial absence of zeolite. The central core layer and the aqueous gypsum slurry for the central core layer preferably has a substantial absence of hydrotalcite. The terms substantial absence of zeolite and substantial absence of hydrotalcite permits impurity amounts of less than 0.01 wt. % zeolite and less than 0.01 wt. % hydrotalcite in the set central core layer, and less than 0.01 wt. % zeolite and less than 0.01 wt. % hydrotalcite on a dry (water free) basis in the aqueous gypsum slurry for the central core layer. Typically the central core layer and the aqueous gypsum slurry for the central core layer have no uniformly distributed zeolite and no uniformly distributed hydrotalcite. More typically the central core layer and the aqueous gypsum slurry for the central core layer have no zeolite and no hydrotalcite.

FIG. 1 depicts a cross-sectional view of the wallboard panel (gypsum board) 10 of the invention in which a gypsum core 11 (for example 0.5 inch thick) is sandwiched between a second cover sheet (back cover sheet) 14 and a first cover sheet (face cover sheet) 18. The second cover sheet (back cover sheet) 14 is typically of same thickness or thinner than the face cover sheet 18. The inner surface of the first cover sheet 18 creates a bond side 28 which faces the gypsum core 11. The gypsum core 11 comprises a central core layer 12 and any densified layer. FIG. 1 shows a first densified layer 22. The first densified layer 22 is relatively thinner than the central core layer 12. The inner surface of the second cover sheet 14 creates a bond side 24 of the second cover sheet 14 which faces the gypsum core 11. The outer surface of the second cover sheet 14 (back cover sheet) is typically the surface that faces wall framing (see FIG. 3) of a room after the wallboard panel 10 is installed as an interior wall. The outer surface of the first cover sheet 18 (face cover sheet) faces inside of a room after the wallboard panel 10 is installed as the interior wall.

The relatively thin, first densified layer 22 is between the central core layer 12 and the second cover sheet 14 to contact the central core layer 12 and the second cover sheet 18. The central core layer 12 and the first densified layer 22 are contiguous with one another.

Typically, the first densified layer 22 has the same composition as the central core layer 12, except that the first densified layer 22 further has the salt absorbent particles comprising salt absorbent material that comprises, or consists of, zeolite, or hydrotalcite, or a blend of zeolite and hydrotalcite, and typically has fewer air voids thereby making the first densified layer 22 more dense than the central core layer 12.

The first densified layer 22 has the salt absorbent material in an amount of 0.5 to 10 parts by weight, preferably 0.5 to 5 parts by weight, more preferably 1 to 5 parts by weight, furthermore preferably 1 to 3 parts by weight, or 1 to 2 parts by weight, for example 0.5 to 1.5 parts by weight, per 100 parts by weight of the set gypsum of the first densified layer 22. Typically the salt absorbent material is distributed uniformly throughout the first densified layer 22. The salt absorbent material may comprise or consist of the zeolite, or the hydrotalcite, or the blend of the zeolite and the hydrotalcite. In contrast, the parts by weight of salt absorbent material per 100 parts by weight of the set gypsum in the central core layer 12 is relatively less than parts by weight of salt absorbent material per 100 parts by weight of the set gypsum in the first densified layer. For example the central core layer 12 may have a substantial absence of salt absorbent material.

The first densified layer 22 has at least 60 wt. %, preferably at least 70 wt. %, more preferably at least 80 wt. %, calcium sulfate dihydrate. Typically the first densified layer 22 has at least 90 wt. % or at least 95 wt. % calcium sulfate dihydrate. The setting of the stucco in the aqueous first densified layer slurry used to prepare the first densified layer 22 results in the set gypsum containing the calcium sulfate dihydrate of the first densified layer.

The aqueous first densified layer slurry employed to make the first densified layer 22 has the salt absorbent material comprising, or consisting of, zeolite, or hydrotalcite, or a blend of zeolite and hydrotalcite. The salt absorbent material is in an amount of 0.5 to 10 parts by weight, preferably 0.5 to 5 parts by weight, more preferably 1 to 5 parts by weight, furthermore preferably 1 to 3 parts by weight, or 1 to 2 parts by weight, for example 0.5 to 1.5 parts by weight, per 100 parts by weight of the stucco of the first densified layer slurry.

Figure 2:
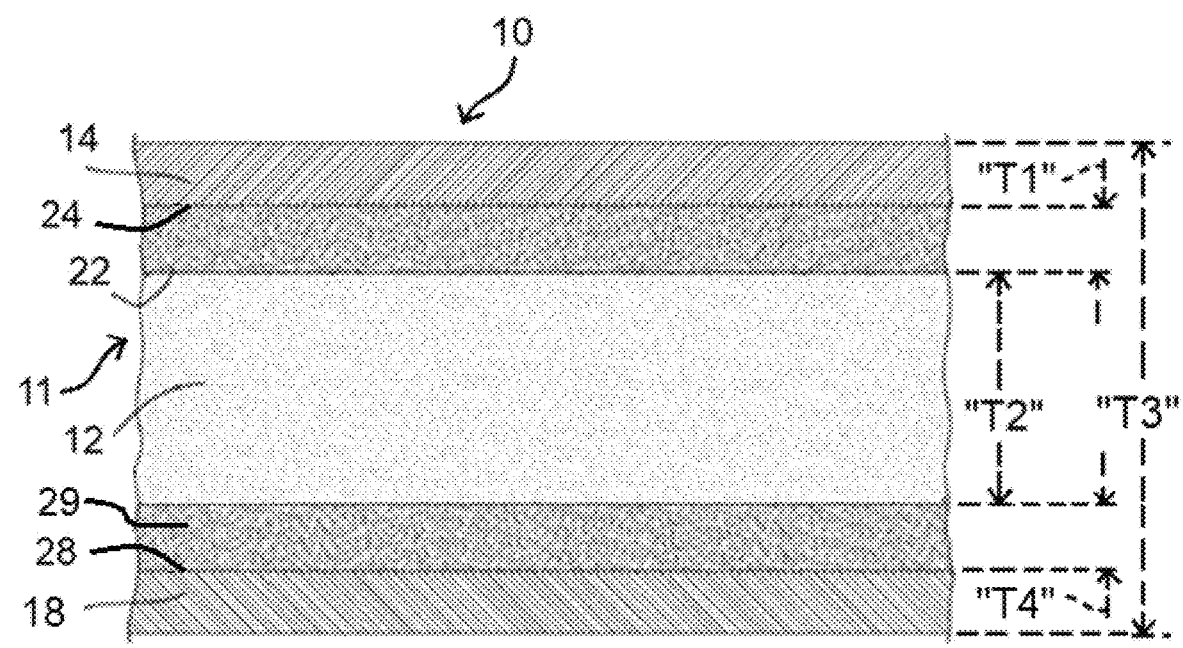
FIG. 2 shows a cross-sectional view of a gypsum board of the invention, in which the first densified layer is between the second cover sheet and the central core layer and a second densified layer is between a first cover sheet and the central core layer.

A second densified layer 29 (see FIG. 2) may also be added between the first cover sheet (face cover sheet) 18 and the core 12. The second densified layer 29 is relatively thinner than the central core layer 12. Thus, in the embodiment of FIG. 2 the gypsum core 11 comprises a central core layer 12, the relatively thin, first densified layer 22, and the relatively thin, second densified layer 29. The second densified layer 29, is of the same or different composition as the first densified layer 22. The second densified layer 29 has at least 60 wt. %, preferably at least 70 wt. %, more preferably at least 80 wt. % calcium sulfate dihydrate. Typically the second densified layer 29 has at least 90 wt. % or at least 95 wt. % calcium sulfate dihydrate. The second densified layer 29 typically has fewer air voids than the central core layer 12.

The second densified layer 29 may be employed with or without salt absorbent particles comprising the salt absorbent material comprising zeolite, or hydrotalcite, or a blend of zeolite and hydrotalcite. Thus, the salt absorbent material may be absent from the second densified layer 29. However, preferably the second densified layer 29 is employed with the salt absorbent particles.

Typically, if the second densified layer 29 is employed without the salt absorbent particles it may have the same composition, except for being more dense, than the central core layer 12.

However, the second densified layer may have 0 to less than 0.5 parts by weight, more typically 0 to 0.4 parts by weight, further typically 0 to 0.3 parts by weight, preferably 0 to 0.2 parts by weight, more preferably 0 to 0.1 parts by weight, furthermore preferably 0 to 0.05 parts by weight, or 0 to 0.01 parts by weight, or 0 parts by weight, salt absorbent material comprising zeolite, or hydrotalcite, or a blend of zeolite and hydrotalcite, per 100 parts by weight of the set gypsum. If the second densified layer has less than 0.5 parts by weight salt absorbent material then the parts by weight salt absorbent material per 100 parts by weight of the set gypsum in the center core layer may be the same or different, preferably relatively lower. Typically, if the second densified layer 29 is employed with the salt absorbent particles, the parts by weight salt absorbent material per 100 parts by weight of the set gypsum of the central core layer 12 is relatively less than the parts by weight zeolite and/or hydrotalcite per 100 parts by weight of the set gypsum of the second densified layer 29.

Likewise, the aqueous second densified layer slurry may have 0 to less than 0.5 parts by weight, more typically 0 to 0.4 parts by weight, further typically 0 to 0.3 parts by weight, preferably 0 to 0.2 parts by weight, more preferably 0 to 0.1 parts by weight, furthermore preferably 0 to 0.05 parts by weight, or 0 to 0.01 parts by weight, or 0 parts by weight parts by weight, salt absorbent material per 100 parts by weight of the stucco. If the aqueous second densified layer slurry has less than 0.5 parts by weight salt absorbent material per 100 parts by weight of the set gypsum then the parts by weight salt absorbent material per 100 parts by weight of stucco in the aqueous central core layer slurry may be the same or different, preferably relatively lower. Likewise, typically the parts by weight salt absorbent material per 100 parts by weight of the stucco of the aqueous central core layer slurry is relatively less than the parts by weight salt absorbent material per 100 parts by weight of the stucco of the aqueous second densified layer slurry.

If the second densified layer 29 is employed with the salt absorbent particles comprising salt absorbent material in order to provide the salt absorbent material in an amount of 0.5 to 10 parts by weight, preferably 0.5 to 5 parts by weight, more preferably 1 to 5 parts by weight, furthermore preferably 1 to 3 parts by weight, or 1 to 2 parts by weight, for example 0.5 to 1.5 parts by weight, per 100 parts by weight of the set gypsum, then the central core layer 12 has relatively less parts by weight salt absorbent material per 100 parts by weight of the set gypsum. Also, the second densified layer 29 may have the same composition as the first densified layer 22. The aqueous second densified layer slurry employed to make this second densified layer 29 contains the salt absorbent material in an amount of 0.5 to 10 parts by weight, preferably 0.5 to 5 parts by weight, more preferably 1 to 5 parts by weight, furthermore preferably 1 to 3 parts by weight, or 1 to 2 parts by weight, for example 0.5 to 1.5 parts by weight, per 100 parts by weight of the stucco for the second densified layer slurry. Typically the salt absorbent material, if present, is distributed uniformly throughout the second densified layer 29. Also, the parts by weight salt absorbent material per 100 parts by weight of the stucco of the aqueous central core layer slurry is relatively less than the parts by weight salt absorbent material per 100 parts by weight of the stucco of this aqueous second densified layer slurry. Also, this aqueous second densified layer slurry may have the same composition as the aqueous first densified layer slurry.

Preferably the second densified layer comprises:
at least 60 wt. %, preferably at least 70 wt. %, more preferably at least 80 wt. %, typically at least 90 wt. % or typically at least 95 wt. % said calcium sulfate dihydrate on a dry (water free) basis,
150 to 4000 parts by weight chloride, typically about 300 to about 3000 parts by weight, more typically from about 400 to about 2000 parts by weight, and further typically from about 600 to about 1000 parts by weight, per 1,000,000 parts by weight said calcium sulfate dihydrate, and
optionally the salt absorbent material comprising zeolite, hydrotalcite or a blend of zeolite and hydrotalcite in an amount of 0.5 to 10 parts by weight, preferably 0.5 to 5 parts by weight, more preferably 1 to 5 parts by weight, furthermore preferably 1 to 3 parts by weight, or 1 to 2 parts by weight, for example 0.5 to 1.5 parts by weight, per 100 parts by weight of the set gypsum of the second densified layer.

Preferably the second densified layer results from setting of an aqueous second densified layer slurry made from the stucco, the salt absorbent particles, and water, wherein the stucco comprises calcium sulfate hemihydrate and one or more chloride salts, and wherein the aqueous second densified layer slurry is made from:

at least 60 wt. %, preferably at least 70 wt. %, more preferably at least 80 wt. %, typically at least 90 wt. % or typically at least 95 wt. % said calcium sulfate hemihydrate on a dry (water free) basis, 150 to 4000 parts by weight chloride anion, typically about 300 to about 3000 parts by weight, more typically from about 400 to about 2000 parts by weight, and further typically from about 600 to about 1000 parts by weight, per 1,000,000 parts by weight said calcium sulfate hemihydrate, and optionally the salt absorbent material comprising zeolite, hydrotalcite or a blend of zeolite and hydrotalcite in an amount of 0.5 to 10 parts by weight, preferably 0.5 to 5 parts by weight, more preferably 1 to 5 parts by weight, furthermore preferably 1 to 3 parts by weight, or 1 to 2 parts by weight, for example 0.5 to 1.5 parts by weight, per 100 parts by weight of the stucco for the second densified layer slurry; and the water at a weight ratio of water to the calcium sulfate hemihydrate of 0.2:1 to 1.2:1.

Collectively, the central core layer 12 and the thin, first densified layer 22 and, if present a second thin, densified layer 29 (FIG. 2) between the first cover sheet 18 and the central core layer 12, may define the interior of gypsum board 10. Thus, other interior layers may be absent. The central core layer 12 is a relatively lower-density region or layer. The first densified layer 22 is a relatively higher-density region or layer. Typically, the aqueous gypsum slurry used to form the central core layer 12 has been foamed. Thus, the low-density region may be formed from a gypsum slurry in a foamed state. In contrast, the aqueous gypsum slurry used for forming the thin, first densified layer 22, and the thin, second densified layer 29 (FIG. 2), if present, has not been foamed. Thus, the first densified layer 22, and second densified layer 29 if present, are relatively denser than the central core layer 12. Typically, the first densified layer 22, and the second densified layer 29 if present, have a density of at least about 1.1 times higher than a density of the central core layer 12.

The high-density regions (the densified layers) may have a lower porosity associated therewith than does the low-density region (core). Typically, when making the board, the thin, first densified layer 22 is applied to an inner surface of the second cover sheet 14. Then the second cover sheet 14 bearing the thin, densified layer 22 is applied to the central core layer 12 to interpose the thin, densified layer 22 between the second cover sheet 14 and the low-density region (central core layer 12).

When foamed, the gypsum core, for example central core layer 12, resulting from the set foamed gypsum slurry has a total void volume of 10 to 92 volume percent, particularly 30 to 90 volume percent, and more particularly 30 to 85 volume percent or 45 to 80 volume percent. The total void volume of the densified layer is relatively less than the void volume of the central core layer. Typically, the densified layer resulting from the set gypsum densified layer slurry has a total void volume of less than 30 volume percent, preferably less than 20 volume percent.

The gypsum core, for example gypsum core 11, generally has a density of 15 to 55 pounds/cubic foot. Preferably, the gypsum core 11 has a density of about 15 to 40 pounds per cubic foot, typically, 20 to 40 pounds per cubic foot, or 30 to 40 pounds per cubic foot.

The gypsum board core preferably has a mass of pounds per area less than 2200 lbs/msf, wherein the lbs/msf values are for a ⅝ inch (1.59 cm) thick gypsum board core and subject to proportional adjustment for thicker or thinner gypsum boards. For example, a half inch thick board core has a mass of pounds per area less than 1680 lbs/msf, rather than less than 2200 lbs/msf as in the case of the ⅝ inch thick board.

Typically the board of the invention (including the gypsum core, any other gypsum layer(s), any cover sheets, and any other layers), for example the board 10 including all layers and cover sheets, has an overall thickness "T3" of about ⅜ inch to about 1 inch (0.95-2.54 cm). Preferably, the overall thickness "T3" is ⅜"-¾" (0.95-1.90 cm), typically ⅝ inch (1.59 cm) or 0.25 inches (0.635 cm) to about 0.625 inches (1.59 cm). The central core (e.g., central core layer 12 of FIG. 1) generally has a thickness "T2" of about 0.25 inches to about 1.0 inch (0.635-2.54 cm), typically about 0.375 inches to about 0.9 inches (0.95-2.23 cm).

The densified layer(s) can have any suitable thickness. Typically thickness "T1" of the first densified layer 22 is 5% to 25% of thickness "T3" of the gypsum board 10. Typically the first densified layer 22 has a thickness ("T1") of from about 0.02 inches to about 0.2 inches (about 0.05 to about 0.5 cm), for example, from about 0.0625 inch to about 0.125 inch (about 0.16 to about 0.32 cm). The thickness "T2" of the central core layer 12 is greater than the thickness "T1" of the first densified layer 22.

The optional second densified layer 29 (FIG. 2), if present, typically has a thickness ("T4") that is 5% to 25% of thickness "T3" of the gypsum board 10. Typically thickness "T4" of the second densified layer 29 is from about 0.02 inches to about 0.2 inches (about 0.05 to about 0.5 cm) which may be the same or different thickness as the first densified layer 22. The thickness "T2" of the central core layer 12 is greater than the thickness "T4" of the second densified layer 29. The board 10 may have an absence of additional layers other than those shown in FIGS. 1 and 2.

Each densified layer may be formed at an entire surface of a respective cover sheet and/or along the peripheral edges of the cover sheet. The densified layer typically provides beneficial properties to the board surfaces, such as increased hardness, improved nail pull strength, etc. The densified layer along the peripheral edges of the cover sheet typically provides improved edge hardness and other beneficial properties. The densified layer is applied to one or both cover sheets, or to equivalent portions of the core/cover sheet construction.

Gypsum and Stucco (Calcined Gypsum)

The base material from which gypsum wallboard and other gypsum products are manufactured is the hemihydrate form of calcium sulfate ($CaSO_4 \cdot \frac{1}{2}H_2O$), typically provided in the raw material known as "stucco" or "calcined gypsum", which is produced by heat conversion (calcination) of the dihydrate form of calcium sulfate ($CaSO_4$), typically provided in the raw material known as "gypsum". During the making of wall board the stucco sets to form set gypsum.

The calcium sulfate hemihydrate, used to form the crystalline matrix of the central core layer and any densified layer, typically comprises beta calcium sulfate hemihydrate, water-soluble calcium sulfate anhydrite, alpha calcium sulfate hemihydrate, or mixtures of any or all of these. The calcium sulfate hemihydrate is obtained from natural or synthetic sources. For example, the gypsum source from which the stucco was made may be a synthetic gypsum source, such as a low-quality synthetic gypsum obtained from a power plant flue gas stream. In some aspects, the stucco may include non-gypsum minerals, such as minor amounts of clays or other components that are associated with the gypsum source or are added during the calcination, processing and/or delivery of the stucco to the mixer. Typically the raw gypsum has at least 60 wt. %, preferably at least 70 wt. %, more preferably at least 80 wt. %, typically at least 90 wt. % or typically at least 95 wt. % calcium sulfate dihydrate. Thus, typically when the raw gypsum is calcined to form stucco, the resulting stucco has at least 60 wt. %, preferably at least 70 wt. %, more preferably at least 80 wt. %, typically at least 90 wt. % or typically at least 95 wt. % calcium sulfate hemihydrate.

The stucco is mixed with water to make the deposited aqueous slurry, of the central core and any densified layer of the invention, have calcium sulfate hemihydrate in an amount of at least 60 wt. %, preferably at least 70 wt. %, more preferably at least 80 wt. % of the dry (water-free) materials of the aqueous slurry. Typically the stucco is mixed with water to make the deposited aqueous slurry have calcium sulfate hemihydrate in an amount of at least 90 wt. % or at least 95 wt. % of the dry (water-free) materials of the aqueous slurry. Use of calcium sulfate anhydrite is also contemplated, although it is preferably used in small amounts of less than 20 wt. %, typically less than 5 wt. %, of the dry (water-free) materials of the aqueous slurry.

Typically, the central core layer and each densified layer of the gypsum board of the invention, resulting from setting the aqueous slurry, is at least 60 wt. %, more typically at least 70 wt. %, and preferably at least 80 wt. % calcium sulfate dihydrate. The central core layer and each densified layer are further preferably at least 90 wt. % or at least 95 wt. % calcium sulfate dihydrate.

Typically, the aqueous gypsum slurry for the central core layer and each densified layer, have less than 10 wt. %, more typically an absence, of Portland cement or other hydraulic cement on a dry (water-free) basis. Thus, the central core layer and each densified layer have less than 10 wt. %, more typically an absence, of Portland cement or other hydraulic cement.

Typically, the aqueous gypsum slurry for the central core and each densified layer have less than 10 wt. %, more typically an absence, of fly ash on a dry (water-free) basis. Thus, the central core and each densified layer have less than 10 wt. %, more typically an absence, of fly ash.

Typically, the aqueous gypsum slurry for the central core and each densified layer, have less than 10 wt. %, more typically an absence, of calcium carbonate on a dry (water-free) basis. Thus, the central core and each densified layer have less than 10 wt. %, more typically an absence, of calcium carbonate.

Chloride Salts

The chloride anions in the aqueous slurry used for products and methods of the invention may arise from any source. Generally, the chloride anions arise from chloride salts in the stucco in the aqueous slurry used to form the board core and any densified layer of the invention. However, the chloride anions may also arise from impurities, such as one or more chloride salts, in water used to make the gypsum slurry.

The concentration of the chloride anion in the aqueous slurry used to make gypsum board products of the invention may range from about 150 to 4000 parts by weight chloride anion, typically about 300 to about 3000 parts by weight chloride anion per 1,000,000 parts by weight calcium sulfate hemihydrate. More typically concentration of the chloride anion in the aqueous slurry used to make gypsum board products of the invention may range from about 400 to about 2000 parts by weight chloride anion, and further typically from about 600 to about 1000 parts by weight chloride anion, per 1,000,000 parts by weight calcium sulfate hemihydrate. About 150 to 4000 parts by weight chloride anion per 1,000,000 parts by weight calcium sulfate hemihydrate is also termed herein as 150 to 4000 ppm chloride anions.

Chloride salts are any salts which contain chloride. Thus, they include monovalent salts of chloride anion and a monovalent cation, such as sodium or potassium. Thus, they include divalent salts of chloride anions and a divalent cation, such as calcium or magnesium. Other chloride salts, are also contemplated, such as trivalent salts of chloride anions and a trivalent cation. Typically, the one or more chloride salts are any of NaCl, KCl, $MgCl_2$, $CaCl_2$), or any combination thereof Cover Sheets The first cover sheet has an outer surface and an inner surface, wherein its inner surface faces a first face of the gypsum core. The second cover sheet has an outer surface and an inner surface, wherein its inner surface faces a second face of the gypsum core. Generally the outer surface of the first cover sheet is a facer sheet that faces outwardly from the wall once the gypsum board has been installed on a wall frame.

The materials of the cover sheets may be selected from paper, woven or nonwoven glass fiber (fiberglass), or combination of these fibrous materials. The first and second cover sheets may be of the same or different material. Typically the first and second cover sheets materials are paper sheets or glass fiber nonwoven mats.

When made of paper, the first and second cover sheets may be made from any suitable paper material having any suitable basis weight. If both cover sheets are paper cover sheets, the paper cover sheets may be the same or different paper materials. Various paper grades can be used in gypsum panels, including Manila grade paper with a smooth calendared finish which is often used as the facer paper cover sheet, and Newsline paper with a rougher finish which is often used as the back paper cover sheet. Typically both paper grades are multi-ply with at least one liner ply and several filler plies. However, if desired, at least one paper cover sheet or both paper cover sheets may be made of single-ply paper. Newsline is similar to Manila, but it is thinner because of its lighter weight.

If desired, to enhance strength (e.g., nail pull strength), especially for lower density gypsum boards, one or both of the cover sheets can be formed from paper having a basis weight of, for example, at least about 45 lbs/MSF (e.g., from about 45 to about 65 lbs/MSF, about 45 to about 60 lbs/MSF, about 45 to about 55 lbs/MSF, about 50 to about 65 lbs/MSF, about 50 to about 60 lbs/MSF, or the like). If desired, the first cover sheet may have a higher basis weight than does the second cover sheet, which may provide enhanced nail pull resistance and handling. The second cover sheet can have a lower basis weight if desired (e.g., a basis weight of less than 45 lbs/MSF, e.g., from about 33 to 45 lbs/MSF (e.g., about 33 to about 40 lbs/MSF).

Optionally, the cover sheets may incorporate and may have added to their exposed surfaces, coatings of materials providing surfaces for specific construction applications such as exterior sheathing, roofing, tile backing, etc. Thus, they may be uncoated or, for example, coated with a polymer coating and/or a hydrophobic finish.

Hydrotalcite

Hydrotalcites are layered minerals of either natural and synthetic origin, which are structurally derived from the brucite mineral-$Mg(OH)_2$. Hydrotalcite is a layered double hydroxide (LDH) of general formula $Mg_6Al_2CO_3(OH)_{16} \cdot 4H_2O$, whose name is derived from its resemblance with talc and its high water content. Multiple structures containing loosely bound carbonate ions exist in hydrotalcite. In the presence of chloride ions, hydrotalcite can exchange the carbonate ions from the interlayer of its crystal structure and replace them with the chloride ions. Hydrotalcite minerals with Mg2+, Fe2+, Mn2+, Zn2+, Cu2+, and Ni2+ anions in the position of Mg2+ ions are often found in natural geological deposits (natural rock) and therefore can be obtained from such sources. However, sometimes hydrotalcite group materials are synthesized to achieve sufficient purity or other desired properties. In general the salt absorbent particles of hydrotalcite have a typical D50 median particle size of 0.1 to 100 micrometers, more typically 0.5 to 50 micrometers, for example 0.5 to 10 micrometers, preferably 0.5 to 5 micrometers. Typically the hydrotalcite from natural geological deposits is ground and sieved to produce particles having a typical D50 median particle size in the range of 1 to 100 micrometers. Hydrotalcite made synthetically typically has a D50 median particle size of 0.1 to 10 micrometers, for example 0.5 to 1 micrometers.

Zeolite

Zeolites are three-dimensional, microporous, crystalline solids with well-defined structures that contain aluminium, silicon, and oxygen in their regular framework; cations and water are located in the pores. The zeolite particle itself has a rigid, 3-dimensional crystalline structure (similar to a honeycomb) having a network of interconnected tunnels and cages. These tunnels and cages are nearly uniform, allowing the crystal to act as a molecular sieve.

There are three typical uses of zeolites in industry: ion exchange, adsorption and catalysis. Zeolites are used to adsorb a variety of materials. This includes applications in drying, purification, and separation. The porous structure of zeolites can be used to "sieve" molecules having certain dimensions and allow them to enter the pores. This property can be fine-tuned by variating the structure by changing the size and number of cations around the pores. Hydrated cations within the zeolite pores are bound loosely to the zeolite framework, and can readily exchange with other cations when in aqueous media. For example, in water softening devices zeolites exchange the sodium in the zeolite for the calcium and magnesium present in the water.

Typical zeolite for use in the invention may comprise one or more zeolites such as Zeolite A, FAU zeolites (LSX, MSX, X, Y), CHA zeolites (chabazite), offretite, erionite, mordenite, gmelinite, mazzite, HEU zeolites (clinoptilolite), ZSM-3, EMT, EMC-2, ZSM-18, ZK5, ZSM-5, ZSM-11, Zeolite Beta, Zeolite type L, and mixtures of two or more of them. Typical zeolite may comprise LSX, MSX, X, and X zeolites, and mixtures of two or more of them. Typical zeolite may comprise 13X, Zeolite Beta and 5A zeolites, and mixtures of two or more of them. The various types of zeolites present in the zeolite are determined by XRD (X-Ray Diffraction). The amount of zeolites is also measured by XRD and is expressed as % by weight relative to the total weight of the zeolite adsorbent material. However, the invention can also use other types of zeolite. The zeolites are either natural zeolites or the synthetic zeolites from Hydrothermal synthesis. If zeolites are recovered from natural rock, crushing and grinding are typically employed to arrive at the particle size. Typically, the salt absorbent particles comprising zeolites for the invention have a D50 median particle size of 0.1 to 100 micrometers, preferably 1 to 100 micrometers, more preferably 0.5 to 50 micrometers, furthermore preferably 1 to 50 micrometers, for example 20 to 40 micrometers. More typically, zeolites suitable for the invention are commercially available Zeolite Beta, Zeolite 13X or Zeolite 5A with a D50 median particle size of 1 to 100 micrometers, for example 20 to 40 micrometers.

The zeolite that can be used in the context of the present invention, typically has a specific surface area of $>50$ $m^2/g$, more typically $>100$ $m^2/g$.

Optional Additives

Optionally, various additives may be present in the central core layer or densified layer or the gypsum slurry used to form the central core layer or densified layer.

Additives and other components of the gypsum slurry may be added in various ways. For example, various combinations of components may be pre-mixed before entering a mixer, either as one or more dry components and/or as one or more wet components. Singular components may similarly be introduced to the mixer in wet or dry form. If introduced in a wet form, the components may be included in a carrier fluid, such as water, in any suitable concentration.

Additives that may be present in the gypsum slurry used to form the central core layer or denser gypsum layer include, but are not limited to, enhancing agents, starches, foam (prepared from a suitable foaming agent), dispersants, polyphosphates (e.g., sodium trimetaphosphate), retarders, accelerators, recalcination inhibitors, binders, adhesives, secondary dispersing aids, leveling or non-leveling agents, thickeners, bactericides, fungicides, pH adjusters, buffers, colorants, reinforcing materials, fire retardants, water repellants (for example siloxane), fillers, and mixtures thereof. There may also be an absence of one or more of these additives.

The enhancing additives include strengthening additives, for example, boric acid, nano-cellulose, micro-cellulose, or any combination thereof, that helps produce desired strength properties.

The starch, when present, can be a pre-gelatinized (cooked) starch and/or an uncooked starch. In this regard, starches are classified as carbohydrates and contain two types of polysaccharides: linear amylose and branched amylopectin. Starch granules are semi-crystalline, e.g., as seen under polarized light, and are insoluble in water at room temperature or near room temperature. Uncooked starches are characterized as being cold water insoluble and having a semi-crystalline structure. Typically, uncooked starches are obtained by wet milling and are not modified by heating wet starch as in the case of cooked starches. Pre-gelatinized, or cooked, starches are characterized as being cold water soluble and having a non-crystalline structure. The pregelatinized starch may also be a strength-imparting additive.

Typically the aqueous slurry for the central core layer and/or densified layer has less than 10 wt. %, more typically less than 5 wt. %, starch on a dry basis. Thus, typically the central core layer and/or densified layer has less than 10 wt. % starch. %, more typically less than 5 wt. %. There may also be an absence of starch. Optionally, the slurry formulations for use in preparing central core layers and densified layer(s) of the present disclosure can comprise the pre-gelatinized starch (or functionally equivalent starch) in an amount equal to more than 2% of the weight of the stucco.

Fibers can optionally be used in the methods and composition of the present invention. The fibers may include mineral fibers (also known as mineral wool), glass fibers, carbon fibers, and mixtures of such fibers, as well as other comparable fibers providing comparable benefits to the wallboard. For example, glass fibers can be incorporated in the gypsum central core layer slurry and/or the densified layer slurry and resulting crystalline core structure. The glass fibers in such aspects may have an average length of about 0.5 to about 0.75 inches and a diameter of about 11 to about 17 microns. In other aspects, such glass fibers may have an average length of about 0.5 to about 0.675 inches and a diameter of about 13 to about 16 microns. In yet other aspects, E-glass fibers are utilized having a softening point above about 800° C. or above at least about 900° C. Mineral wool or carbon fibers such as those known to those of ordinary skill may be used in place of or in combination with glass fibers.

Fibers, when included, can be present in the gypsum central core layer slurry and/or the densified layer slurry in amounts on a dry basis per 100 pbw (pbw=parts by weight) of calcium sulfate hemihydrate of about 0.5 to about 10 pbw; preferably about 1 to about 8 pbw; more preferably about 2 to about 7 pbw; and most preferably about 3 to about 6 pbw. There may also be an absence of fibers.

Optionally, one or more phosphate-containing compounds can also be included in the slurry, if desired. For example, these phosphate-containing components can include water-soluble components and can be in the form of an ion, a salt, or an acid, namely, condensed phosphoric acids, each of which comprises two or more phosphoric acid units; salts or ions of condensed phosphates, each of which comprises two or more phosphate units; and monobasic salts or monovalent ions of orthophosphates as well as water-soluble acyclic polyphosphate salts. Illustrative examples are described in U.S. Pat. Nos. 6,342,284; 6,632,550; 6,815,049; and 6,822,033, which are incorporated herein by reference in their entirety.

Phosphate-containing components can enhance green strength, resistance to permanent deformation (e.g., sag), dimensional stability, and the like. Trimetaphosphate compounds can be used, including, for example, sodium trimetaphosphate, potassium trimetaphosphate, lithium trimetaphosphate, and ammonium trimetaphosphate. Sodium trimetaphosphate (STMP) is commonly used, although other phosphates may be suitable, including for example sodium tetrametaphosphate, sodium hexametaphosphate having from about 6 to about 27 repeating phosphate units and having the molecular formula $Na_{n+2}P_nO_{3n+1}$ wherein n=6-27, tetrapotassium pyrophosphate having the molecular formula $K_4P_2O_7$, trisodium dipotassium tripolyphosphate having the molecular formula $Na_3K_2P_3O_{10}$, sodium tripolyphosphate having the molecular formula $Na_5P_3O_{10}$, tetrasodium pyrophosphate having the molecular formula $Na_4P_2O_7$, aluminum trimetaphosphate having the molecular formula $Al(PO_3)_3$, sodium acid pyrophosphate having the molecular formula $Na_2H_2P_2O_7$, ammonium polyphosphate having 1000-3000 repeating phosphate units and having the molecular formula $(NH_4)_{n+2}P_nO_{3n+1}$ wherein n=1000-3000, or polyphosphoric acid having two or more repeating phosphoric acid units and having the molecular formula $H_{n+2}P_nO_{3n+1}$ wherein n is two or more.

The phosphates usually are added in a dry form and/or an aqueous solution liquid form, with the dry ingredients added to the slurry mixer, with the liquid ingredients added to the mixer, or in other stages or procedures.

When present, the phosphate can be included in the gypsum slurry in a dry form or in a form in water (e.g., a phosphate solution from about 5% to about 20%, such as about a 10% solution). If included, the phosphate can be present in any suitable amount (solids/solids basis), such as from about 0.01% to about 0.5% by weight of the stucco, e.g., from about 0.03% to about 0.4%, from about 0.1% to about 0.3%, or from about 0.12% to about 0.4% by weight of the stucco. There may also be an absence of phosphate.

The gypsum slurry can optionally include at least one dispersant to enhance fluidity. The dispersant(s) may be introduced to the gypsum slurry in a dry form, optionally with other additives, and/or in a liquid form, optionally with other liquid components. Examples of suitable dispersants include naphthalene sulfonates, such as polynaphthalene sulfonic acid and its salts (polynaphthalene sulfonates) and derivatives, which are condensation products of naphthalene sulfonic acids and formaldehyde, as well as polycarboxylate dispersants, such as polycarboxylic ethers, for example. Other examples of suitable dispersants include lignosulfonates or sulfonated lignin. Lignosulfonates are water-soluble anionic polyelectrolyte polymers, which are byproducts from the production of wood pulp using sulfite pulping.

Lower molecular weight dispersants may be desirable. Lower molecular weight naphthalene sulfonate dispersants may be favored because they trend to a lower water demand than higher viscosity, higher molecular weight dispersants. Thus, molecular weights from about 3,000 to about 10,000 (e.g., about 8,000 to about 10,000) may be desirable molecular weights for a dispersant. If desired, the molecular weight of the polycarboxylate dispersants can be from about 20,000 to about 60,000, which may exhibit less retardation than dispersants having molecular weights above about 60,000.

Typical naphthalene sulfonates are a naphthalene sulfonate solution in water, having a range of about 35% to about 55% by weight naphthalene sulfonate solids content. However, if desired the naphthalene sulfonates can be used in dry solid or powder form.

When present, the dispersant can be included in the gypsum slurry in any suitable (solids/solids) amount, such as, for example, about 0.1% to about 5% by weight of the stucco, e.g., about 0.1% to about 4%, about 0.1% to about 3%, about 0.2% to about 3%, about 0.5% to about 3%, about 0.5% to about 2.5%, about 0.5% to about 2%, about 0.5% to about 1.5%, or the like. There may also be an absence of any one or more of polynaphthalene sulfonates, polycarboxylic ethers or lignosulfonates.

Accelerators and/or retarders may be added to the gypsum central core layer slurry and/or the densified layer slurry to modify the rate at which the calcium sulfate hemihydrate hydration reactions take place. When present, the accelerator and/or retarder each can be incorporated in the gypsum slurry in an amount on a solid basis of, e.g., about 0% to about 10% by weight of the stucco (e.g., about 0.1% to about 10%), such as, for example, from about 0% to about 5% by weight of the stucco (e.g., about 0.1% to about 5%). Suitable accelerators may include, for example, calcium sulfate dihydrate, carbohydrate-coated calcium sulfate, calcium sulfate dihydrate/organic phosphonate, and calcium sulfate dihydrate/organic phosphate. There may also be an absence of accelerators. There may also be an absence of retarders.

Foam (also known as foam water) may optionally be introduced into the gypsum central core layer slurry and/or the densified layer slurry (preferably the gypsum core slurry) in amounts that provide the above mentioned reduced core density and panel weight. The foaming agent to produce the foam is typically a soap or other suitable surfactant. The introduction of foam in the gypsum central core layer slurry in the proper amounts, formulations, and process will produce a desired network and distribution of voids within the core of the final dried wallboards. This void structure permits the reduction of the gypsum and other core constituents and the core density and weight, while maintaining desired panel structural and strength properties. If present, foaming agents may comprise a major weight portion of unstable component and a minor weight portion of stable component (e.g., where unstable and blend of stable/unstable are combined). The weight ratio of unstable component to stable component is effective to form an air void distribution within the set gypsum core, as described in U.S. Pat. Nos. 5,643,510; 6,342,284; and 6,632,550, which are incorporated herein by reference in their entirety. The approaches for adding foam to a gypsum central core layer slurry are known in the art and one example of such an approach is discussed in U.S. Pat. No. 5,683,635, the disclosure of which is incorporated by reference herein. Evaporative water voids, generally having voids of about 5 μm or less in diameter, also contribute to the total void distribution along with the aforementioned air (foam) voids. The volume ratio of voids with a pore size greater than about 5 microns to the voids with a pore size of about 5 microns or less, is from about 0.5:1 to about 9:1, such as, for example, about 0.7:1 to about 9:1, about 1.8:1 to about 2.3:1, or the like. The foaming agent is present in the gypsum slurry in an amount, for example, of less than about 0.5% by weight of the stucco, such as about 0.01% to about 0.5%, about 0.01% to about 0.2%, about 0.02% to about 0.4%, about 0.02% to about 0.2%, about 0.01% to about 0.1%, or the like. There may also be an absence of foaming agents.

Components for fire and/or water resistance can also be included in the gypsum slurry for the central core layer or densified layer. Examples include, for instance, siloxanes (water resistance); fiber; heat sink additives such as aluminum trihydrite (ATH), magnesium hydroxide or the like; and/or high expansion particles as discussed above (e.g., expandable to about 300% or more of original volume when heated for about one hour at 1560° F.). Further disclosure on such additives may be found in U.S. Pat. No. 8,323,785, which is incorporated by reference in its entirety. Perlite can be included. High expansion vermiculite or other high expansion particles may be included, although other fire resistant materials can be included.

If present, fire or water resistance additives can be included in any suitable amount as desired depending, e.g., on fire rating, and like performance parameters. For example, if included, the fire or water resistance additives can be individually present in an amount from about 0.3% to about 10% by weight of the stucco, such as from about 1% to about 10%, about 1% to about 8%, about 2% to about 10%, about 2% to about 8%, or the like. If included, the siloxane may desirably be introduced in the form of an emulsion. The slurry may then be shaped and dried under conditions which promote the polymerization of the siloxane to form a highly crosslinked silicone resin. A catalyst which promotes the polymerization of the siloxane to form a highly crosslinked silicone resin can be added to the gypsum slurry. Solventless methyl hydrogen siloxane fluid can be used as the siloxane. This product is a siloxane fluid containing no water or solvents. Typically about 0.3% to about 1.0%, more typically about 0.4% to about 0.8%, siloxane may be present in the gypsum slurry based on weight of the stucco. There may also be an absence of any one or more of these components for fire and/or water resistance. For example, there may be an absence of siloxane.

There may also be an absence of any one or more of the above described additives.

Water

Water is added to the slurry for the central core layer or densified layer in any amount that makes the slurry flowable. The amount of water to be used varies greatly according to the application with which it is being used, the exact dispersant being used, the properties of the calcium sulfate hemihydrate, and the additives being used.

Water used to make the slurry should be as pure as practical for best control of the properties of both the slurry and the set plaster. Salts and organic compounds are well known to modify the set time of the slurry, varying widely from accelerators to set inhibitors. Some impurities lead to irregularities in the structure as the interlocking matrix of dihydrate crystals forms, reducing the strength of the set product. Product strength and consistency is thus enhanced by the use of water that is as contaminant-free as practical.

The water can be present in the gypsum central core layer slurry and/or the densified layer slurry of the present invention at a weight ratio of water to calcium sulfate hemihydrate of about 0.2:1 to about 1.2:1; preferably, about 0.3:1 to about 1.1:1; more preferably, about 0.6:1 to about 1:1; most preferably 0.7:1 to 0.95:1, typically about 0.6 to about 1.2, or about 0.8 to about 1.0.

Systems

Figure 3:
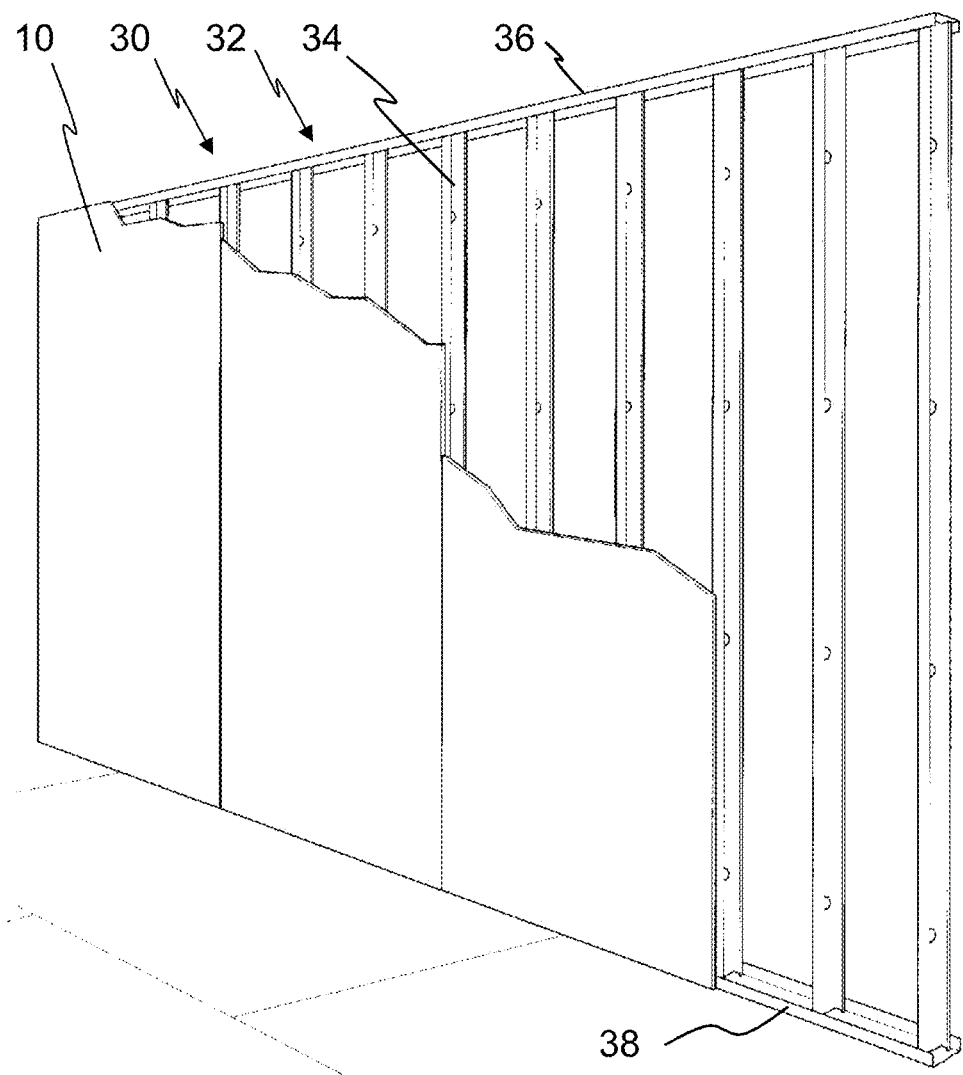
FIG. 3 shows a perspective view of a gypsum board of the present invention attached to one side of a metal stud wall suitable for use in an illustrative wall system of the present invention.

FIG. 3 is a perspective view of a typical exterior sheathing system 30 that may employ gypsum wallboard made from the treated gypsum. FIG. 3 shows metal stud wall "skeleton" 32 which includes a plurality of metal studs 34, an upper track 36, and a lower track 38. Gypsum boards 10 (FIG. 1 or FIG. 2) may be secured in any known manner to one or both sides of the metal studs 34 to close the wall and form the interior surface or surfaces of the wall or a ceiling. A typical metal stud wall "skeleton" may be fabricated according to U.S. Pat. No. 6,694,695 to Collins et al., incorporated herein by reference, which is suitable for combination with an exterior sheathing panel to achieve an exterior wall system of the present invention. This metal frame system is merely provided as illustrative as other metal frames may also be employed. Further alternately, the stud wall may alternately comprise wooden studs.

Methods for Manufacturing Gypsum Board

Various methods can be employed for preparing a gypsum board of the present invention from an aqueous gypsum slurry comprising calcium sulfate hemihydrate and a high amount of chloride salt. However, instead of a conventional gypsum source, a gypsum source containing the one or more chloride salts, as described above, may be substituted in the manufacturing process.

The present invention covers methods for making a gypsum board having a gypsum core layer between a first cover sheet and a second cover sheet, comprising:

The invention providing a method for making a gypsum board having a core, comprising a central core layer and a first densified layer, the core having opposed first and second faces, the core comprising set gypsum, the set gypsum comprising calcium sulfate dihydrate, wherein the core is between a first cover sheet and a second cover sheet, comprising:

preparing an aqueous central core layer slurry comprising a mixture of stucco and water, wherein the stucco comprises calcium sulfate hemihydrate and one or more chloride salts, disposing the aqueous central core layer slurry between the first cover sheet and the second cover sheet, wherein the first cover sheet comprises a first paper cover sheet or a first fiber glass mat, wherein the second cover sheet comprises a second paper cover sheet or a second fiber glass mat, and disposing an aqueous first densified layer slurry comprising a mixture of water and stucco and salt absorbent particles between the second cover sheet and the central core layer to contact the second cover sheet and the central core layer, wherein the salt absorbent particles comprise salt absorbent material, wherein the salt absorbent material comprises zeolite, or hydrotalcite, or a blend of zeolite and hydrotalcite, wherein the stucco comprises calcium sulfate hemihydrate and the one or more chloride salts, wherein preferably the salt absorbent material is uniformly distributed in the aqueous first densified layer slurry, wherein the aqueous central core layer slurry is made from:
  at least 60 wt. %, preferably at least 70 wt. %, more preferably at least 80 wt. %, typically at least 90 wt. % or typically at least 95 wt. % said calcium sulfate hemihydrate on a dry (water free) basis,
  150 to 4000 parts by weight chloride anion, typically about 300 to about 3000 parts by weight, more typically from about 400 to about 2000 parts by weight, and further typically from about 600 to about 1000 parts by weight, per 1,000,000 parts by weight said calcium sulfate hemihydrate, and
  the water at a weight ratio of water to the calcium sulfate hemihydrate of 0.2:1 to 1.2:1; and wherein the aqueous first densified layer slurry is made from:
  at least 60 wt. %, preferably at least 70 wt. %, more preferably at least 80 wt. %, typically at least 90 wt. % or typically at least 95 wt. % said calcium sulfate hemihydrate on a dry (water free) basis,
  150 to 4000 parts by weight chloride anion, typically about 300 to about 3000 parts by weight, more typically from about 400 to about 2000 parts by weight, and further typically from about 600 to about 1000 parts by weight, per 1,000,000 parts by weight said calcium sulfate hemihydrate,
  the salt absorbent material in an amount of 0.5 to 10 parts by weight, preferably 1 to 5 parts by weight, more preferably 1 to 3 parts by weight, per 100 parts by weight of the stucco for the first densified layer slurry, and
  the water at a weight ratio of water to the calcium sulfate hemihydrate of 0.2:1 to 1.2:1;

allowing the aqueous gypsum central core layer slurry to set to form a central core layer comprising calcium sulfate dihydrate, and allowing the aqueous gypsum first densified layer slurry to set to form a first densified layer comprising calcium sulfate dihydrate and the salt absorbent particles, to form a gypsum board preform comprising the central core layer, the first densified layer, the first cover sheet, and the second cover sheet;

cutting the gypsum board preform to produce the gypsum board; and drying the gypsum board;

wherein parts by weight of salt absorbent material per 100 parts by weight stucco in the aqueous central core layer slurry is relatively less than parts by weight of salt absorbent material per 100 parts by weight stucco in the aqueous first densified layer slurry, wherein parts by weight of salt absorbent material per 100 parts by weight set gypsum in the central core layer is relatively less than parts by weight of salt absorbent material per 100 parts by weight set gypsum in the first densified layer;

wherein the aqueous central core layer slurry is less dense than the aqueous first densified layer slurry;

wherein the core has a density of about 15 to 55, preferably about 15 to 40, pounds per cubic foot, wherein the first densified layer has a density at least 1.1 times a density of the central core layer, wherein the first densified layer is thinner than the central core layer, and wherein thickness of the first densified layer is 5% to 25% of thickness of the gypsum board.

If desired a second densified layer may be applied between the first cover sheet and the central core layer. The second densified layer may or may not include the salt absorbent particles comprising salt absorbent material that comprise or consist of hydrotalcite and/or zeolite.

Illustrative manufacturing techniques and equipment suitable for forming gypsum board according to the present invention can be found, for example, in U.S. Pat. No. 7,364,676 and U.S. Patent Application Publication 2010/0247937, each of which is incorporated herein by reference in its entirety. To produce gypsum board, the stucco is mixed with water and additives to form an aqueous gypsum slurry which is continuously fed between continuous layers of paper or glass mat on a board machine. One paper or glass mat cover sheet is called the face cover sheet, and the other paper or glass mat cover sheet is called the back paper sheet, or back.

Such processes discharge the first cover sheet onto a moving conveyor. Dry and/or wet components of the aqueous gypsum slurry are fed to a mixer (e.g., a pin or pinless mixer), where they are agitated to form the aqueous gypsum slurry. The aqueous gypsum slurry can be made with any suitable water/calcium sulfate hemihydrate ratio for disposition onto the first cover sheet. Since gypsum board is normally formed "face down," this first cover sheet typically corresponds to face cover sheet upon completion of the fabrication process. The mixer comprises a main body and a discharge conduit (e.g., a gate-canister-boot arrangement as known in the art, or an alternative arrangement, such as that described in U.S. Pat. Nos. 6,494,609 and 6,874,930, which are incorporated herein by reference in their entirety). In some process configurations, the discharge conduit may include a slurry distributor with either a single feed inlet or multiple feed inlets, such as those described in U.S. Patent Application Publication 2012/0168527 and 2012/0170403, which are incorporated herein by reference in their entirety. When using a slurry distributor with multiple feed inlets, the discharge conduit can include a suitable flow splitter, such as those described in U.S. Patent Application Publication 2012/0170403. Foaming agent (typically soap) can be added in the discharge conduit of the mixer (e.g., in the gate as described, for example, in U.S. Pat. Nos. 5,683,635 and 6,494,609, which are incorporated herein by reference) or in the main body, if desired. Slurry discharged from the discharge conduit after all ingredients have been added, including foaming agent, is the primary gypsum slurry and is used to form the central core layer. This gypsum slurry is discharged onto the moving first cover sheet.

After mixing, the aqueous gypsum slurry optionally has foam added to decrease the product density. Foam is generated by combining soap and water. The foam may then be injected into the aqueous gypsum slurry after it exits from the mixer through a hose or chute. Foam is typically added to the portion of aqueous gypsum slurry for the less dense central core layer, but not for the portion of slurry for the densified layer.

When the foam and the aqueous gypsum slurry have been brought together, the resulting slurry moves toward and is poured onto a conveyor lined with a first piece of facing material which is the first cover sheet. Another piece of facing material which is the second cover sheet is placed on top of the slurry, forming a sandwich assembly with the slurry between the two facing materials. The sandwich assembly is fed to a forming plate or other forming device, the height of which determines the thickness of the board. Next the continuous sandwich assembly is cut into appropriate lengths at a cutting knife, usually eight feet to twelve feet. As the board moves down a conveyer line to form a panel the slurry is allowed to harden (set). The calcium sulfate recrystallizes or rehydrates, reverting to its original rock state to form a board core comprising an interlocking crystalline matrix of set gypsum. The cover sheets become bonded to the core as the gypsum sets. The panel is then cut to length and conveyed through kilns or dryers to remove any free moisture. Temperatures in the kiln typically range from 450° F. to 500° F. maximum. A benefit of the invention is that, during manufacture of the gypsum board, the zeolite and/or hydrotalcite in the first (top) densified layer assists in the bonding of the second (top) cover sheet to the core without having to add the zeolite and/or hydrotalcite in the entire core.

As described above, at least one of the cover sheets is in interfacial contact with a high-density region or layer of the central core layer, also known as a densified layer. The first densified layer is typically contiguous with the central core layer after setting. Where foam is inserted into the discharge conduit, a stream of secondary gypsum slurry can be removed from the mixer body before foaming to provide a slurry for forming the densified layer. The first densified layer containing the salt absorbent particles may be deposited onto the moving second cover sheet before the main portion of the gypsum slurry is deposited for forming the central core layer. After being discharged from the discharge conduit, the gypsum slurry for the core is spread, as necessary, over the first cover sheet (optionally the first cover sheet has a densified layer with or without the salt absorbent particles). At this point, the spread gypsum core slurry is contacted with the second cover sheet, upon which the first densified layer has already been deposited. The resulting wet assembly is in the form of a multi-layer assembly, which is a precursor to the final gypsum board product. The first cover sheet which optionally bears a second densified layer with or without salt absorbent particles can be formed from the same or different gypsum slurry as the first densified layer.

Figure 4:
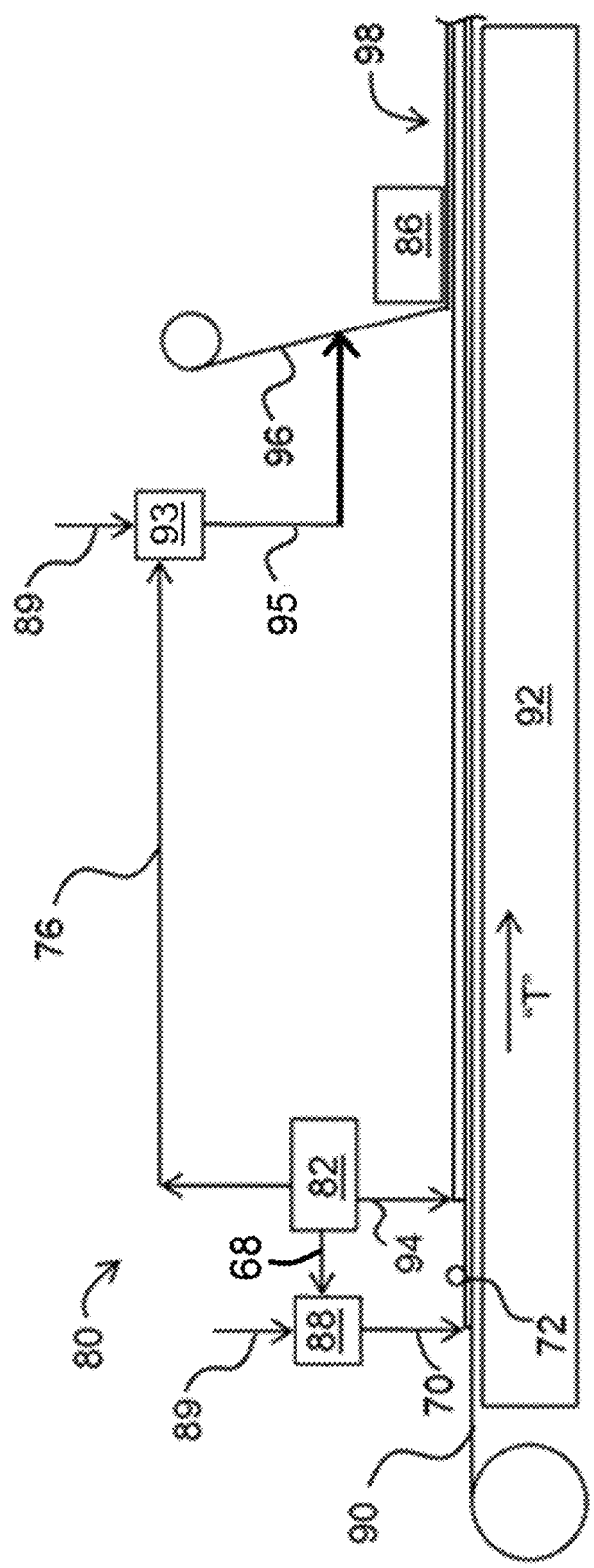
FIG. 4 shows a process flow diagram of a version of the present method.

FIG. 4 illustrates an example of a wet end 80 (upstream portion) of a manufacturing production line for producing a layered gypsum board of the present invention having a gypsum layer between two cover sheets, and provided with two densified layers. The cover sheets are, for example, made of paper, for example manila paper or Kraft paper, woven or non-woven glass mats, or combinations thereof. The cover sheet materials may be uncoated or coated with, for example, a pre-applied polymer coating and a hydrophobic finish.

The wet end 80 includes a gypsum slurry mixing and dispensing assembly 82 and a forming station 86. A first moving web 90 of first cover sheet material (face sheet) moves in a longitudinal direction of travel "T" along the forming table 92. The gypsum core slurry 94 is mixed in the gypsum slurry mixing and dispensing assembly 82 where additives and optional foaming of the slurry occurs. While the gypsum slurry mixing and dispensing assembly 82 is illustrated as a single component of the wet end 80, there can be multiple components that comprise the gypsum slurry mixing and dispensing assembly 82.

An aqueous slurry 76 for the first densified layer (22, FIG. 2) may be fed to a mixer 93 to be mixed with salt absorbent particles 89 comprising zeolite and/or hydrotalcite and then applied as slurry 95 to the second cover sheet material (back sheet material) 96 which is then applied on top of the deposited core layer slurry 94 to contact the first densified layer with the central core layer slurry and form a multilayer structure. Then the multilayer structure is passed through the forming station 86 to compress the layers into a desired total thickness. The resultant structure is a gypsum board preform 98.

Optionally a second densified layer slurry 68 may be fed to a mixer 88 to be mixed with salt absorbent particles 89 comprising zeolite and/or hydrotalcite and then applied as slurry 70 to the first cover sheet material 90 to form a second densified layer on the first cover sheet material 90, and passes under a first gypsum densified layer roller 72, before depositing the gypsum central core layer slurry 94. Each gypsum densified layer is relatively denser than the gypsum central core layer slurry which may be a foamed gypsum slurry. As is known in the art, the densified layer can be achieved by directing a portion of the slurry out of the mixer and into a densified layer mixer prior to introduction of foam or by beating foam out of the slurry. Thus, the gypsum central core layer slurry 94 for the central core layer of the board is deposited onto the gypsum densified layer slurry 70. In an alternative process, the densified layer 70 may be applied without salt absorbent particles 89 comprising zeolite and/or hydrotalcite and the mixer 88 is omitted. In another alternative process, the densified layer 70 is not applied and the mixer 88 is omitted.

Typically the outer surface of the applied moving webs 96 and 90 are in contact with no additional layers.

Additional components can be included in the wet end 80 of the manufacturing line. The gypsum densified layers will typically be thinner and denser than the central core layer. Typically the calcined gypsum (calcium sulfate hemihydrate) slurry for the central core layer is foamed to be less dense than the slurry 70 and the slurry 76 of the densified layers. Thus if desired, calcined gypsum central core layer slurry stream 94 may pass through a foamer device (not shown), which for instance mixes the calcined gypsum central core layer slurry stream 94 with foam and/or air, prior to deposition on the first coated nonwoven glass fiber cover sheet material 90. Typically the slurry streams 70, 76 for the gypsum densified layers have the same composition and density. However if desired, the slurry streams for the gypsum densified layers 70, 76 can have different compositions and/or densities. FIG. 4 shows all the gypsum slurries 70, 76, 95 coming from the same calcined gypsum slurry mixing and dispensing assembly 82. However, the calcined gypsum slurries 70, 76, 95 can come from different mixing and dispensing assemblies to have different properties, such as different densities.

The gypsum densified layer roller 72, the forming table 92, the forming station 86 can all comprise conventional equipment suitable for their intended purposes as is known in the art. The wet end 80 can be equipped with other conventional equipment as is known in the art.

The calcined gypsum in the gypsum slurries 70, 76, 95 reacts with the water and sets as a conveyor moves the gypsum board preform 98 down a manufacturing line. The gypsum board preform 98 is dried and cut into segments of predetermined dimensions at a point along the line where the gypsum board preform 98 has set sufficiently. The segments can be dried (e.g., in a kiln) to drive off excess water, and processed to provide the final layered wallboard of desired dimensions.

The forming station 86 is the location in the board line where wet board precursor is sized to a pre-determined width and thickness, and optionally, length. Thus, the forming station includes, or can be, any device capable of performing a final mechanical spreading and/or shaping of the slurry across the width of the backing layer, many of which are known in the art. The forming station comprises a means of conforming the slurry thickness and width to the final desired thickness and width of a wet board precursor that, when set, will produce the cementitious board product. The final desired slurry thickness and width produced at the forming station can, of course, differ from the final thickness and width of the finished board product. For example, the slurry thickness and/or width can expand and/or contract during crystallization (i.e., setting) and drying of the slurry. Typically, the desired slurry thickness is substantially equal to the desired board thickness (e.g., about 0.375" (about 0.95 cm), about 0.5" (about 1.27 cm), about 0.625" (about 1.59 cm), about 0.75" (about 1.90 cm), or about 1" (about 2.54 cm). By way of illustration only, the final board thickness typically is within about + or −⅛" (about 0.32 cm) or less of the final slurry thickness.

The forming station includes any device that is capable of creating the desired slurry thickness and width of the wet board precursor. Suitable devices include, for example, a forming plate, a forming roller, a forming press, a screed, and the like. The particular device used will depend, in part, on the type of cementitious board being produced. In a preferred embodiment, for example when the board forming system is a gypsum board or acoustical panel forming system, the board forming station comprises a forming plate as is known in the art. The board forming system of any of the above embodiments optionally further comprises a blade for cutting wet board precursor or dry cementitious board product to the desired lengths, and/or a drying region capable of removing water from the set cementitious board.

In an embodiment, to produce gypsum board having front and back paper cover sheets, the stucco is mixed with water and additives to form an aqueous slurry which is continuously fed between continuous layers of paper on a board machine. As the board moves down a conveyer line to form a panel, the calcium sulfate recrystallizes or rehydrates, reverting to its original rock state. The paper becomes bonded to the core as the gypsum sets. The panel is then cut to length and conveyed through dryers to remove any free moisture.

CLAUSES OF THE INVENTION

The following clauses describe various aspects of the invention.

Clause 1. A gypsum board comprising:
a core with a central core layer and a first densified layer, the core having opposed first and second faces, the core comprising set gypsum, the set gypsum comprising calcium sulfate dihydrate;
a first cover sheet having an outer surface and an inner surface, the first cover sheet inner surface facing the first face of the core, wherein the first cover sheet comprises a first paper cover sheet or a first fiber glass mat;
a second cover sheet having an outer surface and an inner surface, the second cover sheet inner surface facing the second face of the core, wherein the second cover sheet comprises a second paper cover sheet or a second fiber glass mat;
wherein the core is between the first cover sheet and the second cover sheet;
the first densified layer comprising the set gypsum and salt absorbent particles (preferably said salt absorbent particles are uniformly distributed throughout the first densified layer), said salt absorbent particles comprising salt absorbent material, wherein the salt absorbent material comprises zeolite, or hydrotalcite, or a blend of zeolite and hydrotalcite, wherein the first densified layer is between the central core layer and the second cover sheet, wherein opposing sides of the first densified layer respectively contact the central core layer and the second cover sheet;
wherein the central core layer comprises:
at least 60 wt. %, preferably at least 70 wt. %, more preferably at least 80 wt. %, typically at least 90 wt. % or typically at least 95 wt. % said calcium sulfate dihydrate, and
150 to 4000 parts by weight chloride, typically about 300 to about 3000 parts by weight, more typically from about 400 to about 2000 parts by weight, and further typically from about 600 to about 1000 parts by weight, per 1,000,000 parts by weight said calcium sulfate dihydrate;
wherein the first densified layer comprises:
at least 60 wt. %, preferably at least 70 wt. %, more preferably at least 80 wt. %, typically at least 90 wt. % or typically at least 95 wt. % said calcium sulfate dihydrate,
150 to 4000 parts by weight chloride, typically about 300 to about 3000 parts by weight, more typically from about 400 to about 2000 parts by weight, and further typically from about 600 to about 1000 parts by weight, per 1,000,000 parts by weight said calcium sulfate dihydrate, and
the salt absorbent material in an amount of 0.5 to 10 parts by weight, preferably 1 to 5 parts by weight, more preferably 1 to 3 parts by weight, per 100 parts by weight of the set gypsum of the first densified layer;
wherein parts by weight of salt absorbent material per 100 parts by weight of the set gypsum in the central core layer is relatively less than parts by weight of salt absorbent material per 100 parts by weight of the set gypsum in the first densified layer;
wherein the core has a density of about 15 to 55, preferably about 15 to 40, pounds per cubic foot,
wherein the first densified layer has a density at least 1.1 times a density of the central core layer,
wherein the first densified layer is thinner than the central core layer, and
wherein thickness of the first densified layer is 5% to 25% of thickness of the gypsum board.

Clause 2. The gypsum board of clause 1,
the core further comprising a second densified layer comprising set gypsum, wherein the second densified layer is between the core layer and the first cover sheet, wherein opposing sides of the second densified layer respectively contact the core layer and the first cover sheet;

wherein the second densified layer comprises:
  at least 60 wt. %, preferably at least 70 wt. %, more preferably at least 80 wt. %, typically at least 90 wt. % or typically at least 95 wt. % said calcium sulfate dihydrate on a dry (water free) basis,
  150 to 4000 parts by weight chloride, typically about 300 to about 3000 parts by weight, more typically from about 400 to about 2000 parts by weight, and further typically from about 600 to about 1000 parts by weight, per 1,000,000 parts by weight said calcium sulfate dihydrate, and wherein the second densified layer has a density at least 1.1 times density of the core layer, wherein the second densified layer is thinner than the core layer, and wherein thickness of the second densified layer is 5% to 25% of thickness of the gypsum board.

Clause 3. The gypsum board of clause 2, wherein the second densified layer further comprises salt absorbent particles (preferably said salt absorbent particles are uniformly distributed), said salt absorbent particles comprising zeolite and/or hydrotalcite;

wherein the aqueous second densified layer slurry further comprises:
  the zeolite and/or hydrotalcite in an amount of 0.5 to 10 parts by weight, preferably 1 to 5 parts by weight, more preferably 1 to 3 parts by weight, per 100 parts by weight of the set gypsum of the second densified layer.

Clause 4. A gypsum board comprising:

a core comprising a central core layer and a first densified layer, the core having opposed first and second faces, the core comprising set gypsum, the set gypsum comprising calcium sulfate dihydrate;

a first cover sheet having an outer surface and an inner surface, the first cover sheet inner surface facing the first face of the core, wherein the first cover sheet comprises a first paper cover sheet or a first fiber glass mat;

a second cover sheet having an outer surface and an inner surface, the second cover sheet inner surface facing the second face of the core, wherein the second cover sheet comprises a second paper cover sheet or a second fiber glass mat;

wherein the core is between the first cover sheet and the second cover sheet;

the first densified layer comprising the set gypsum and salt absorbent particles (preferably said salt absorbent particles are uniformly distributed throughout the first densified layer), said salt absorbent particles comprising salt absorbent material, wherein said salt absorbent material comprises zeolite, or hydrotalcite, or a blend of zeolite and hydrotalcite, wherein the first densified layer is between the central core layer and the second cover sheet, wherein opposing sides of the first densified layer respectively contact the central core layer and the second cover sheet;

wherein the central core layer results from setting of an aqueous central core layer slurry comprising a mixture of stucco and water between the first cover sheet and the second cover sheet, wherein the stucco comprises calcium sulfate hemihydrate and one or more chloride salts;

wherein the aqueous central core layer slurry is made from:
  at least 60 wt. %, preferably at least 70 wt. %, more preferably at least 80 wt. %, typically at least 90 wt. % or typically at least 95 wt. % said calcium sulfate hemihydrate on a dry (water free) basis,
  150 to 4000 parts by weight chloride anion, typically about 300 to about 3000 parts by weight, more typically from about 400 to about 2000 parts by weight, and further typically from about 600 to about 1000 parts by weight, per 1,000,000 parts by weight said calcium sulfate hemihydrate, and
  the water at a weight ratio of the water to the calcium sulfate hemihydrate of 0.2:1 to 1.2:1;

wherein the first densified layer results from setting of an aqueous first densified layer slurry made from the stucco, the salt absorbent particles, and water, wherein the stucco comprises calcium sulfate hemihydrate and one or more chloride salts, and wherein the aqueous central core layer slurry is made from:
  at least 60 wt. %, preferably at least 70 wt. %, more preferably at least 80 wt. %, typically at least 90 wt. % or typically at least 95 wt. % said calcium sulfate hemihydrate on a dry (water free) basis,
  150 to 4000 parts by weight chloride anion, typically about 300 to about 3000 parts by weight, more typically from about 400 to about 2000 parts by weight, and further typically from about 600 to about 1000 parts by weight, per 1,000,000 parts by weight said calcium sulfate hemihydrate,
  the salt absorbent material in an amount of 0.5 to 10 parts by weight, preferably 1 to 5 parts by weight, more preferably 1 to 3 parts by weight, per 100 parts by weight of the stucco for the first densified layer slurry; and
  the water at a weight ratio of water to the calcium sulfate hemihydrate of 0.2:1 to 1.2:1;

wherein parts by weight of said salt absorbent material per 100 parts by weight stucco in the aqueous central core layer slurry is relatively less than parts by weight of said salt absorbent material per 100 parts by weight stucco in the aqueous first densified layer slurry, wherein parts by weight of said salt absorbent material per 100 parts by weight set gypsum in the central core layer is relatively less than parts by weight of said salt absorbent material per 100 parts by weight set gypsum in the first densified layer;

wherein the core has a density of about 15 to 55, preferably about 15 to 40, pounds per cubic foot, wherein the first densified layer has a density at least 1.1 times a density of the central core layer, wherein the first densified layer is thinner than the central core layer, and wherein thickness of the first densified layer is 5% to 25% of thickness of the gypsum board.

Clause 5. The gypsum board of clause 1 or 4, wherein the salt absorbent particles have a D50 median particle size in a range from 0.1 to 100 micrometers, preferably 0.5 to 50 micrometers.

Clause 6. The gypsum board of clause 1 or 4, wherein each absorbent particle is at least 80 wt. %, more preferably at least 90 wt. %, furthermore preferably at least 95 wt. %, typically at least 98 wt. %, zeolite or hydrotalcite.

Clause 7. The gypsum board of clause 1 or 4, wherein the core layer further comprises 0-0.1% sodium trimetaphosphate, typically 0.02-0.05% sodium trimetaphosphate and wherein the first densified layer further comprises 0-0.1% sodium trimetaphosphate, typically 0.02-0.05% sodium trimetaphosphate.

Clause 8. The gypsum board of clause 1 or 4, wherein the gypsum board core layer has a mass of pounds per area less than 2200 lbs/msf, wherein the mass of pounds per area lbs/msf values are for a ⅝ inch (1.59 cm) thick board and subject to proportional adjustment for thicker or thinner boards.

Clause 9. The gypsum board of clause 1 or 4, wherein the first densified layer comprises the zeolite.

Clause 10. The gypsum board of clause 1 or 4, wherein the first densified layer comprises the hydrotalcite.

Clause 11. The gypsum board of clause 1 or 4, wherein the first densified layer comprises zeolite chosen from zeolites type X, zeolites type A, zeolite type Y, FAU zeolites (LSX, MSX, X, Y), CHA zeolites (chabazite), offretite, erionite, mordenite, gmelinite, mazzite, HEU zeolites (clinoptilolite), ZSM-3, EMT, EMC-2, ZSM-18, ZK5, ZSM-5, ZSM-11, Zeolite Beta, Zeolite type L, and mixtures of two or more of these zeolites.

Clause 12. The gypsum board of clause 1 or 4, wherein the first densified layer comprises Zeolite Beta, Zeolite 13X or Zeolite 5A.

Clause 13. The gypsum board of clause 1 or 4, wherein the first and/or second cover sheets comprise paper sheet.

Clause 14. The gypsum board of clause 1 or 4, wherein the first and/or second cover sheets comprise fiberglass mat.

Clause 15. The gypsum board of clause 1 or 4, wherein the set gypsum is formed from calcined synthetic gypsum comprising the one or more chloride salts and the chloride salts provide at least a portion of the chloride anions.

Clause 16. The gypsum board of clause 4,
the core further comprising a second densified layer comprising set gypsum, wherein the second densified layer is between the central core layer and the first cover sheet, wherein opposing sides of the second densified layer respectively contact the central core layer and the first cover sheet;
wherein the second densified layer resulted from setting of an aqueous second densified layer slurry made from stucco and water, wherein the stucco comprises calcium sulfate hemihydrate and one or more chloride salts, and
wherein the aqueous second densified layer slurry is made from:
at least 60 wt. %, preferably at least 70 wt. %, more preferably at least 80 wt. %, typically at least 90 wt. % or typically at least 95 wt. % said calcium sulfate hemihydrate on a dry (water free) basis,
150 to 4000 parts by weight chloride anion, typically about 300 to about 3000 parts by weight, more typically from about 400 to about 2000 parts by weight, and further typically from about 600 to about 1000 parts by weight, per 1,000,000 parts by weight said calcium sulfate hemihydrate; and
the water at a weight ratio of water to the calcium sulfate hemihydrate of 0.2:1 to 1.2:1;
wherein the second densified layer has a density at least 1.1 times density of the core layer,
wherein the second densified layer is thinner than the central core layer, and
wherein thickness of the second densified layer is 5% to 25% of thickness of the gypsum board.

Clause 17. The gypsum board of clause 16,
wherein the second densified layer further comprises salt absorbent particles (preferably said salt absorbent particles are uniformly distributed), wherein the salt absorbent particles comprise zeolite and/or hydrotalcite;
wherein the aqueous second densified layer slurry comprises:
zeolite and/or hydrotalcite in an amount of 0.5 to 10 parts by weight, preferably 1 to 5 parts by weight, more preferably 1 to 3 parts by weight, per 100 parts by weight of the stucco of the mixture of the second densified layer slurry.

Clause 18. A method of making a gypsum board of any of clauses 1-17 having a core, comprising a central core layer and a first densified layer, the core having opposed first and second faces, the core comprising set gypsum, the set gypsum comprising calcium sulfate dihydrate, wherein the core is between a first cover sheet and a second cover sheet, comprising:
preparing an aqueous central core layer slurry comprising a mixture of stucco and water, wherein the stucco comprises calcium sulfate hemihydrate and one or more chloride salts,
disposing the aqueous central core layer slurry between the first cover sheet and the second cover sheet, wherein the first cover sheet comprises a first paper cover sheet or a first fiber glass mat, wherein the second cover sheet comprises a second paper cover sheet or a second fiber glass mat, and
disposing an aqueous first densified layer slurry comprising a mixture of water and stucco and salt absorbent particles between the second cover sheet and the central core layer to contact the second cover sheet and the central core layer, wherein the salt absorbent particles comprise salt absorbent material, wherein the salt absorbent material comprises zeolite, or hydrotalcite, or a blend of zeolite and hydrotalcite, wherein the stucco comprises calcium sulfate hemihydrate and the one or more chloride salts, wherein preferably the salt absorbent material is uniformly distributed in the aqueous first densified layer slurry,
wherein the aqueous central core layer slurry is made from:
at least 60 wt. %, preferably at least 70 wt. %, more preferably at least 80 wt. %, typically at least 90 wt. % or typically at least 95 wt. % said calcium sulfate hemihydrate on a dry (water free) basis,
150 to 4000 parts by weight chloride anion, typically about 300 to about 3000 parts by weight, more typically from about 400 to about 2000 parts by weight, and further typically from about 600 to about 1000 parts by weight, per 1,000,000 parts by weight said calcium sulfate hemihydrate, and
the water at a weight ratio of water to the calcium sulfate hemihydrate of 0.2:1 to 1.2:1; and
wherein the aqueous first densified layer slurry is made from:
at least 60 wt. %, preferably at least 70 wt. %, more preferably at least 80 wt. %, typically at least 90 wt. % or typically at least 95 wt. % said calcium sulfate hemihydrate on a dry (water free) basis,
150 to 4000 parts by weight chloride anion, typically about 300 to about 3000 parts by weight, more typically from about 400 to about 2000 parts by weight, and further typically from about 600 to about 1000 parts by weight, per 1,000,000 parts by weight said calcium sulfate hemihydrate,
the salt absorbent material in an amount of 0.5 to 10 parts by weight, preferably 1 to 5 parts by weight, more preferably 1 to 3 parts by weight, per 100 parts by weight of the stucco for the first densified layer slurry, and the water at a weight ratio of water to the calcium sulfate hemihydrate of 0.2:1 to 1.2:1;

allowing the aqueous gypsum central core layer slurry to set to form a central core layer comprising calcium sulfate dihydrate, and allowing the aqueous gypsum first densified layer slurry to set to form a first densified layer comprising calcium sulfate dihydrate and the salt absorbent particles, to form a gypsum board preform comprising the central core layer, the first densified layer, the first cover sheet, and the second cover sheet;

cutting the gypsum board preform to produce the gypsum board; and drying the gypsum board;

wherein parts by weight of salt absorbent material per 100 parts by weight stucco in the aqueous central core layer slurry is relatively less than parts by weight of salt absorbent material per 100 parts by weight stucco in the aqueous first densified layer slurry, wherein parts by weight of salt absorbent material per 100 parts by weight set gypsum in the central core layer is relatively less than parts by weight of salt absorbent material per 100 parts by weight set gypsum in the first densified layer;

wherein the aqueous central core layer slurry is less dense than the aqueous first densified layer slurry;

wherein the core has a density of about 15 to 55, preferably about 15 to 40, pounds per cubic foot, wherein the first densified layer has a density at least 1.1 times a density of the central core layer, wherein the first densified layer is thinner than the central core layer, and wherein thickness of the first densified layer is 5% to 25% of thickness of the gypsum board.

Clause 19. The method of clause 18, wherein at least a portion of the aqueous gypsum central core layer slurry is in a foamed state while disposed between the first cover sheet and the second cover sheet.

Clause 20. The method of clause 18, wherein the stucco comprises calcined synthetic gypsum comprising the one or more chloride salts, and the one or more chloride salts provide at least a portion of the chloride anions.

Clause 21. The method of clause 18, further comprising disposing an aqueous second densified layer slurry comprising a mixture of water and stucco between the first cover sheet and the central core layer to contact the first cover sheet and the central core layer, and wherein the aqueous second densified layer slurry comprises a mixture of:

at least 60 wt. %, preferably at least 70 wt. %, more preferably at least 80 wt. %, typically at least 90 wt. % or typically at least 95 wt. % said calcium sulfate hemihydrate on a dry (water free) basis, 150 to 4000 parts by weight chloride anion, typically about 300 to about 3000 parts by weight, more typically from about 400 to about 2000 parts by weight, and further typically from about 600 to about 1000 parts by weight, per 1,000,000 parts by weight said calcium sulfate hemihydrate, and the water at a weight ratio of water to the calcium sulfate hemihydrate of 0.2:1 to 1.2:1; and allowing the aqueous gypsum second densified layer slurry to set to form a second densified layer comprising calcium sulfate dihydrate.

Clause 22. The method of clause 21, wherein the second densified layer further comprises salt absorbent particles (preferably said salt absorbent particles are uniformly distributed), wherein the salt absorbent particles comprise zeolite and/or hydrotalcite;

wherein the aqueous second densified layer slurry comprises:

zeolite and/or hydrotalcite in an amount of 0.5 to 10 parts by weight, preferably 1 to 5 parts by weight, more preferably 1 to 3 parts by weight, per 100 parts by weight of the stucco of the mixture of the second densified layer slurry, and wherein the aqueous gypsum second densified layer slurry is allowed to set to form a second densified layer comprising calcium sulfate dihydrate and the salt absorbent particles.

Clause 23. A wall system comprising framing to which is attached at least one gypsum board of any of clauses 1-17, wherein the outer surface of the first cover sheet faces away from the framing.

The following examples further illustrate the invention but, of course, should not be construed as in any way limiting its scope.

EXAMPLES

Addition of a low concentration of salt absorbents in a relatively denser coating layer.

Several multilayer boards (Newsline paper—relatively denser gypsum coating layer-Core—Manila Paper) were prepared in a lab. These examples used Manila paper (48 lbs./msf) as face paper and Newsline paper (42 lbs./msf) as back paper.

The core formula is shown in Table 1 and the densified layer formula is in Table 2. The chloride was introduced by sodium chloride (NaCl) and magnesium chloride (MgCl2). The central core layer slurry was prepared by soaking dry powders in the solution for 10 seconds and mixed for 10 seconds in Hobart mixer, following by injecting the foam for 12 seconds and mixing another two more seconds. The densified layer slurry was prepared by soaking dry powder in the solution for 5 seconds and mixed for 7 seconds in a blender. Both the central core layer slurry and the densified layer slurry were prepared simultaneously. A thin plastic frame (outer dimension 6.5"×6.5"×1/16" and inner dimension 6.0"×6.0"×1/16") was used as the densified layer mold. A thick plastic frame (outer dimension 6.5"×6.5"×1/2" and inner dimension 6.0×6.0×1/2") was used as the core mold. A piece of 6.5×6.5" of Newsline (back) paper was placed under the densified layer mold. The densified layer slurry was poured onto the densified layer mold and distributed evenly by spatula. The core mold was then placed onto the densified mold. The central core layer slurry was subsequently poured into the core mold and distributed evenly by spatula, and then a piece of 6.0"×6.0" Manila (face) paper was placed on the top of the slurry. To make the board having a consistent thickness, a plastic board with the size of 10 inches×10 inches was covered onto the sample and two pounds of weights were placed on top of the plastic board. After the board was set and hardened, the sample was removed from the mold. The face side and four edges of the board were sealed by aluminum foil and only the back side (Newsline) was exposed for drying. The samples were dried at 450° F. for 20 mins, then moved to a 350° F. oven. After dried at 350° F. for 20 mins, the board was further dried at 110° F. overnight. After the boards were dried, the samples with dimensions of 5 inches×6 inches (the 5 inches being in the machine direction) were cut for the humidified bond test. A ⅛ inch deep straight score line parallel with the long direction of specimen and 2" from one edge was imparted onto the samples with a utility knife. These scored samples were conditioned in an environment of 90° F. and 90% relative humidity. Two samples from each board were taken out of the environmental chamber after one day and 7 days. The board core was snapped along the score without breaking or stressing the paper on the back side of the boards, and the larger piece of the board sample was then rotated and forced downward while the smaller piece was held stationary and horizontally with its face surface up, in an attempt to force the back paper on the back side of the board to peel away from the larger piece. The force was increased until the two pieces came completely apart. The peak load (referred to as Paper-to-Core humidified bond) was recorded. After the sample failed, the sample was removed, and the back surface of the larger piece was then examined to determine on what percentage of its surface the back paper had pulled completely away from the core (referred to as "clean peel"). This percentage is reported in Table 3 as the "% Failure".

TABLE 1

Formula for gypsum core containing 1000 ppm Chloride.

| Raw Materials | Stucco | Accelerator | Starch | 10% STMP* | 1% Retarder | Dispersant | NaCl | MgCl | Water |
|---|---|---|---|---|---|---|---|---|---|
| gram | 400 | 4 | 4 | 0.4 | 7 | 2 | 0.33 | 0.26 | 380 |

*Sodium Trimetaphosphate

TABLE 2

Formula for densified layer containing 1000 ppm Chloride.

| Sample ID | 1000 ppm Cl— #1 | 1000 ppm Cl— Zeolite 5A #2 | 1000 ppm Cl— Zeolite Beta #3 | 1000 ppm Cl— Zeolite 13X #4 | 1000 ppm Cl— Hydrotalc #5 |
|---|---|---|---|---|---|
| Thickness | 1/16" | 1/16" | 1/16" | 1/16" | 1/16" |
| Stucco (g) | 400 | 400 | 400 | 400 | 400 |
| Accelerator (g) | 2 | 2 | 2 | 2 | 2 |
| starch (g) | 4 | 4 | 4 | 4 | 4 |
| NaCl (g) | 0.33 | 0.33 | 0.33 | 0.33 | 0.33 |
| MgCl (g) | 0.26 | 0.26 | 0.26 | 0.26 | 0.26 |
| 10% STMP (g) | 4 | 4 | 4 | 4 | 4 |
| Retarder 1% (g) | 9 | 9 | 9 | 9 | 9 |
| Dispersant (g) | 2 | 2 | 2 | 2 | 2 |
| H2O (g) | 450 | 450 | 450 | 450 | 450 |
| Zeolite 5A (g) |  | 4 |  |  |  |
| Zeolite Beta (g) |  |  | 4 |  |  |
| Zeolite 13X (g) |  |  |  | 4 |  |
| Hydrotalcite (g) |  |  |  |  | 4 |

The humidified bond and failure percentage were measured after one day and 7 days, as shown in Table 3. It is clear that the addition of the salt absorbents (zeolites or hydrotalcite) in the densified layer improve the bond between paper and core. The percentage of salt absorbents to the stucco in the densified layer is about 1%.

TABLE 3

Humidified bond and failure percentage from the samples containing the core in Table 1 and the densified layer in Table 2.

| | | 90° F./90% RH | | | | |
|---|---|---|---|---|---|---|
| | | #1 | #2 | #3 | #4 | #5 |
| | | Board Weight (lbs./msf) | | | | |
| | | 1329 | 1359 | 1321 | 1348 | 1309 |
| 1 day | Load (lbs) | 11.1 | 12.6 | 13.1 | 13.0 | 12.8 |
| | % Failure | 10 | 0 | 5 | 5 | 5 |
| 7 days | Load (lbs) | 9.2 | 10.6 | 10.9 | 11.1 | 11.8 |
| | % Failure | 20 | 5 | 5 | 5 | 0 |

Addition of a High Concentration of the Salt Absorbents in the Relatively Denser Gypsum Coating Layer Several multilayer boards (Newsline paper-relatively denser gypsum coating layer-Core-Manila Paper) were prepared in a lab. The core formula and the densified layer formula are shown in Table 4 and Table 5. The percentage of salt absorbents to the stucco is about 0.28%.

TABLE 4

Formula for gypsum core containing 3000 ppm Chloride.

| Raw Materials | Stucco | Accelerator | Starch | 10% STMP | 1% Retarder | Dispersant | NaCl | MgCl | Water |
|---|---|---|---|---|---|---|---|---|---|
| gram | 400 | 4 | 4 | 0.4 | 7 | 2 | 0.99 | 0.79 | 380 |

TABLE 5

Formula for Densified layer containing 3000 ppm Chloride.

| Sample ID | 3000 ppm Cl— #12 | 3000 ppm Cl— Zeolite 13X #13 | 3000 ppm Cl— Hydrotalc #14 |
|---|---|---|---|
| Thickness | 1/16" | 1/16" | 1/16" |
| Stucco (g) | 400 | 400 | 400 |
| Accelerator (g) | 2 | 2 | 2 |
| starch (g) | 4 | 4 | 4 |
| NaCl (g) | 0.99 | 0.99 | 0.99 |
| MgCl (g) | 0.79 | 0.79 | 0.79 |
| 10% STMP (g) | 4 | 4 | 4 |
| Retarder 1% (g) | 9 | 9 | 9 |
| Dispersant (g) | 2 | 2 | 2 |
| H2O (g) | 450 | 450 | 450 |
| Zeolite 5A (g) | | 8 | |
| Hydrotalcite (g) | | | 8 |

The humidified bond and failure percentage were measured after one day and 7 days, as shown in Table 6. It is clear that the addition of the salt absorbents (zeolites or hydrotalc) in the densified layer improves the bond between paper and core.

TABLE 6

Humidified bond and failure percentage from the samples containing core in Table 9 and Densified layer in Table 10.

| | | 90° F./90% RH | | |
|---|---|---|---|---|
| Sample Identification (ID) | | #12 | #13 | #14 |
| Board Weight (lbs./msf) | | 1296 | 1311 | 1307 |
| 1 day | Load (lbs) | 8.9 | 10.2 | 10.4 |
| | % Failure | 25 | 5 | 5 |
| 7 days | Load (lbs) | 6.4 | 8.9 | 8.8 |
| | % Failure | 35 | 10 | 5 |

Expanded the Exposure Time in 90° F./90% RH Conditions

Several multilayer boards (Newsline paper—densified layer—Core-Manila Paper) were prepared in the lab. The core formula and the densified layer are shown in Table 7 and Table 8.

TABLE 7

Formula for gypsum core containing 2000 ppm Chloride.

| Raw Materials | Stucco | Accelerator | Starch | 10% STMP | 1% Retarder | Dispersant | NaCl | MgCl | Water |
|---|---|---|---|---|---|---|---|---|---|
| gram | 400 | 4 | 4 | 0.4 | 7 | 2 | 0.66 | 0.53 | 380 |

TABLE 8

Formula for Densified layer containing 2000 ppm Chloride.

| Sample ID | 2000 ppm Cl— #12 | 2000 ppm Cl— Zeolite 13X #13 | 2000 ppm Cl— Hydrotalc #14 |
|---|---|---|---|
| Thickness | 1/16" | 1/16" | 1/16" |
| Stucco (g) | 400 | 400 | 400 |
| Accelerator (g) | 2 | 2 | 2 |
| starch (g) | 4 | 4 | 4 |
| NaCl (g) | 0.66 | 0.66 | 0.66 |
| MgCl (g) | 0.53 | 0.53 | 0.53 |
| 10% STMP (g) | 4 | 4 | 4 |
| Retarder 1% (g) | 4 | 4 | 4 |
| Dispersant (g) | 2 | 2 | 2 |
| H2O (g) | 440 | 440 | 440 |
| Zeolite 5A (g) | | 4 | |
| Hydrotalcite (g) | | | 4 |

The humidified bond and failure percentage were measured after one day and again after 21 days, as shown in Table 9. It is clear that the addition of the salt absorbents (zeolites or hydrotalc) in the densified layer improves the bond between paper and core.

TABLE 9

Humidified bond and failure percentage from the samples containing the core in Table 7 and the densified layer in Table 8. 90° F./90% RH

| Sample Identification (ID) | #15 | #16 | #17 |
|---|---|---|---|
| Board Weight (lbs./msf) | 1307 | 1299 | 1371 |
| 1 day Load (lbs) | 9.7 | 11.4 | 11.7 |
| % Failure | 25 | 5 | 5 |
| 21 days Load (lbs) | 6.8 | 8.3 | 8.9 |
| % Failure | 30 | 10 | 5 |

Addition of a High Concentration of the Salt Absorbents in the Relatively Denser Gypsum Coating Layer without STMP Several multilayer boards (Newsline paper—densified layer—Core-Manila Paper) were prepared in the lab. The core formula and the densified layer are shown in Table 10 and Table 11.

TABLE 10

Formula for gypsum core containing 2000 ppm Chloride.

| Raw Materials | Stucco | Accelerator | Starch | 10% STMP | 1% Retarder | Dispersant | NaCl | Water |
|---|---|---|---|---|---|---|---|---|
| gram | 400 | 4 | 4 | 0 | 7 | 2 | 0.66 | 380 |

TABLE 11

Formula for Densified layer containing 2000 ppm Chloride.

| Sample ID | 2000 ppm Cl— #18 | 2000 ppm Cl— Hydrotalc #19 |
|---|---|---|
| Thickness | 1/16" | 1/16" |
| Stucco (g) | 400 | 400 |
| Accelerator (g) | 2 | 2 |
| starch (g) | 4 | 4 |
| NaCl (g) | 0.66 | 0.66 |
| 10% STMP (g) | 0 | 0 |
| Retarder 1% (g) | 4 | 4 |
| Dispersant (g) | 2 | 2 |
| H2O (g) | 440 | 440 |
| Hydrotalcite (g) | — | 4 |

The humidified bond and failure percentage were measured after one day and after 7 days, as shown in Table 12. It is clear that the addition of the salt absorbents (hydrotalc) in the densified layer improved the bond between paper and core.

TABLE 12

Humidified bond and failure percentage from the samples containing the core in Table 10 and the densified layer in Table 11. 90° F./90% RH

| Sample Identification (ID) | #18 | #19 |
|---|---|---|
| Board Weight (lbs./msf) | 1322 | 1319 |
| 1 day Load (lbs) | 10.2 | 11.9 |
| % Failure | 25 | 5 |
| 7 days Load (lbs) | 7.5 | 9.9 |
| % Failure | 30 | 5 |

Variations of the specifically disclosed invention may become apparent to those of ordinary skill in the art upon reading the foregoing description. The inventors expect skilled artisans to employ such variations as appropriate, and the inventors intend for the invention to be practiced otherwise than as specifically described herein. Thus, this invention includes all modifications and equivalents of the subject matter recited in the claims appended hereto as permitted by applicable law. Also, the invention encompasses any combination of the above-described elements in all possible variations thereof unless otherwise indicated herein or otherwise clearly contradicted by context.

All references cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. "Bonding relation" does not mean that two layers are in direct contact. The terms "comprising," "having," "including," and "containing" are to be construed as open-ended terms (i.e., meaning "including, but not limited to,") unless otherwise noted. Recitation of ranges of values herein are intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

The invention claimed is:

1. A gypsum board comprising:
   a core comprising a central core layer and a first densified layer, the core having opposed first and second faces, the core comprising set gypsum, the set gypsum comprising calcium sulfate dihydrate;
   a first cover sheet having an outer surface and an inner surface, the first cover sheet inner surface facing the first face of the core, wherein the first cover sheet comprises a first paper cover sheet or a first fiber glass mat;
   a second cover sheet having an outer surface and an inner surface, the second cover sheet inner surface facing the second face of the core, wherein the second cover sheet comprises a second paper cover sheet or a second fiber glass mat;
   wherein the core is between the first cover sheet and the second cover sheet;
   the first densified layer comprising the set gypsum and salt absorbent particles, said salt absorbent particles comprising salt absorbent material, wherein the salt absorbent material comprises zeolite, or hydrotalcite, or a blend of zeolite and hydrotalcite, wherein the first densified layer is between the central core layer and the second cover sheet, wherein opposing sides of the first densified layer respectively contact the central core layer and the second cover sheet;
   wherein the central core layer comprises:
   at least 60 wt. % of said calcium sulfate dihydrate, and
   150 to 4000 parts by weight chloride per 1,000,000 parts by weight of said calcium sulfate dihydrate;
   wherein the first densified layer comprises:
   at least 60 wt. % of said calcium sulfate dihydrate,
   150 to 4000 parts by weight chloride per 1,000,000 parts by weight of said calcium sulfate dihydrate, and
   the salt absorbent material in an amount of 0.5 to 10 parts by weight per 100 parts by weight of the set gypsum of the first densified layer;
   wherein parts by weight of salt absorbent material per 100 parts by weight of the set gypsum in the central core layer is relatively less than parts by weight of salt absorbent material per 100 parts by weight of the set gypsum in the first densified layer;
   wherein the core has a density of about 15 to 55 pounds per cubic foot,
   wherein the first densified layer has a density at least 1.1 times a density of the central core layer,
   wherein the first densified layer is thinner than the central core layer, and
   wherein thickness of the first densified layer is 5% to 25% of the thickness of the gypsum board;
   wherein the central core layer has less than 0.01 wt. % zeolite and less than 0.01 wt. % hydrotalcite.

2. The gypsum board of claim 1,
   the core further comprising a second densified layer comprising set gypsum, wherein the second densified layer is between the central core layer and the first cover sheet, wherein opposing sides of the second densified layer respectively contact the central core layer and the first cover sheet;
   wherein the second densified layer comprises:
   at least 60 wt. % of said calcium sulfate dihydrate on a dry (water free) basis,
   150 to 4000 parts by weight chloride per 1,000,000 parts by weight of said calcium sulfate dihydrate, and
   wherein the second densified layer has a density at least 1.1 times density of the central core layer,
   wherein the second densified layer is thinner than the central core layer, and
   wherein thickness of the second densified layer is 5% to 25% of the thickness of the gypsum board.

3. The gypsum board of claim 2,
   wherein the second densified layer further comprises salt absorbent particles, said salt absorbent particles comprising zeolite and/or hydrotalcite;
   wherein the aqueous second densified layer slurry further comprises:
   the zeolite and/or hydrotalcite in an amount of 0.5 to 10 parts by weight per 100 parts by weight of the set gypsum of the second densified layer.

4. The gypsum board of claim 1, wherein the salt absorbent particles have a D50 median particle size in a range from 0.1 to 100 micrometers.

5. The gypsum board of claim 1, wherein each absorbent particle is at least 80 wt. % zeolite or hydrotalcite.

6. The gypsum board of claim 1, wherein the central core layer further comprises 0-0.1 wt. % sodium trimetaphosphate and wherein the first densified layer further comprises 0-0.1 wt. % sodium trimetaphosphate.

7. The gypsum board of claim 1, wherein the gypsum board core layer has a ratio of mass of pounds per area less than 440 lbs/msf per ⅛ inch of board thickness.

8. The gypsum board of claim 1, wherein the first densified layer comprises the zeolite.

9. The gypsum board of claim 1, wherein the first densified layer comprises the hydrotalcite.

10. The gypsum board of claim 1, wherein the first densified layer comprises zeolite chosen from zeolites type X, zeolites type A, zeolite type Y, FAU zeolites, CHA zeolites, offretite, erionite, mordenite, gmelinite, mazzite, HEU zeolites, ZSM-3, EMT, EMC-2, ZSM-18, ZK5, ZSM-5, ZSM-11, Zeolite Beta, Zeolite type L, and mixtures of two or more of these zeolites.

11. The gypsum board of claim 1, wherein the first densified layer comprises Zeolite Beta, Zeolite 13X or Zeolite 5A.

12. The gypsum board of claim 1, wherein the first and/or second cover sheets comprise paper sheet.

13. The gypsum board of claim 1, wherein the first and/or second cover sheets comprise fiberglass mat.

14. The gypsum board of claim 1, wherein the set gypsum is formed from calcined synthetic gypsum comprising the one or more chloride salts and the chloride salts provide at least a portion of the chloride anions.

15. A wall system comprising framing to which is attached at least one gypsum board of claim 1, wherein the outer surface of the first cover sheet faces away from the framing.

16. The gypsum board of claim 1, wherein the central core layer has no zeolite and no hydrotalcite.

17. A gypsum board comprising:
a core comprising a central core layer and a first densified layer, the core having opposed first and second faces, the core comprising set gypsum, the set gypsum comprising calcium sulfate dihydrate;
a first cover sheet having an outer surface and an inner surface, the first cover sheet inner surface facing the first face of the core, wherein the first cover sheet comprises a first paper cover sheet or a first fiber glass mat;
a second cover sheet having an outer surface and an inner surface, the second cover sheet inner surface facing the second face of the core, wherein the second cover sheet comprises a second paper cover sheet or a second fiber glass mat;
wherein the core is between the first cover sheet and the second cover sheet;
the first densified layer comprising the set gypsum and salt absorbent particles, said salt absorbent particles comprising salt absorbent material, wherein said salt absorbent material comprises zeolite, or hydrotalcite, or a blend of zeolite and hydrotalcite, wherein the first densified layer is between the central core layer and the second cover sheet, wherein opposing sides of the first densified layer respectively contact the central core layer and the second cover sheet;
wherein the central core layer results from setting of an aqueous central core layer slurry comprising a mixture of stucco and water between the first cover sheet and the second cover sheet, wherein the stucco comprises calcium sulfate hemihydrate and one or more chloride salts;
wherein the aqueous central core layer slurry is made from:
at least 60 wt. % of said calcium sulfate hemihydrate on a dry (water free) basis,
150 to 4000 parts by weight chloride anion per 1,000,000 parts by weight of said calcium sulfate hemihydrate, and
the water at a weight ratio of the water to the calcium sulfate hemihydrate of 0.2:1 to 1.2:1;
wherein the first densified layer results from setting of an aqueous first densified layer slurry made from the stucco, the salt absorbent particles, and water, wherein the stucco comprises calcium sulfate hemihydrate and one or more chloride salts, and
wherein the aqueous first densified layer slurry is made from:
at least 60 wt. % of said calcium sulfate hemihydrate on a dry (water free) basis,
150 to 4000 parts by weight chloride anion per 1,000,000 parts by weight of said calcium sulfate hemihydrate,
the salt absorbent material in an amount of 0.5 to 10 parts by weight per 100 parts by weight of the stucco for the first densified layer slurry; and
the water at a weight ratio of water to the calcium sulfate hemihydrate of 0.2:1 to 1.2:1;
wherein parts by weight of said salt absorbent material per 100 parts by weight stucco in the aqueous central core layer slurry is relatively less than parts by weight of said salt absorbent material per 100 parts by weight stucco in the aqueous first densified layer slurry,
wherein parts by weight of said salt absorbent material per 100 parts by weight set gypsum in the central core layer is relatively less than parts by weight of said salt absorbent material per 100 parts by weight set gypsum in the first densified layer;
wherein the core has a density of about 15 to 55 pounds per cubic foot,
wherein the first densified layer has a density at least 1.1 times a density of the central core layer,
wherein the first densified layer is thinner than the central core layer, and
wherein thickness of the first densified layer is 5% to 25% of the thickness of the gypsum board;
wherein the central core layer has less than 0.01 wt. % zeolite and less than 0.01 wt. % hydrotalcite.

18. The gypsum board of claim 17,
the core further comprising a second densified layer comprising set gypsum, wherein the second densified layer is between the central core layer and the first cover sheet, wherein opposing sides of the second densified layer respectively contact the central core layer and the first cover sheet;
wherein the second densified layer resulted from setting of an aqueous second densified layer slurry made from stucco and water, wherein the stucco comprises calcium sulfate hemihydrate and one or more chloride salts, and
wherein the aqueous second densified layer slurry is made from:
at least 60 wt. % of said calcium sulfate hemihydrate on a dry (water free) basis,
150 to 4000 parts by weight chloride anion per 1,000,000 parts by weight of said calcium sulfate hemihydrate; and
the water at a weight ratio of water to the calcium sulfate hemihydrate of 0.2:1 to 1.2:1;
wherein the second densified layer has a density at least 1.1 times a density of the core layer,
wherein the second densified layer is thinner than the central core layer, and
wherein thickness of the second densified layer is 5% to 25% of the thickness of the gypsum board.

19. The gypsum board of claim 18,
wherein the second densified layer further comprises salt absorbent particles, wherein the salt absorbent particles comprise zeolite and/or hydrotalcite;
wherein the aqueous second densified layer slurry comprises:
zeolite and/or hydrotalcite in an amount of 0.5 to 10 parts by weight per 100 parts by weight of the stucco of the mixture of the second densified layer slurry.

20. A method of making a gypsum board of claim 1 having a core, comprising a central core layer and a first densified layer, the core having opposed first and second faces, the core comprising set gypsum, the set gypsum comprising calcium sulfate dihydrate, wherein the core is between a first cover sheet and a second cover sheet, comprising:
preparing an aqueous central core layer slurry comprising a mixture of stucco and water, wherein the stucco comprises calcium sulfate hemihydrate and one or more chloride salts,
disposing the aqueous central core layer slurry between the first cover sheet and the second cover sheet, wherein the first cover sheet comprises a first paper cover sheet or a first fiber glass mat, wherein the second cover sheet comprises a second paper cover sheet or a second fiber glass mat, and disposing an aqueous first densified layer slurry comprising a mixture of water and stucco and salt absorbent particles between the second cover sheet and the central core layer to contact the second cover sheet and the central core layer, wherein the salt absorbent particles comprise salt absorbent material, wherein the salt absorbent material comprises zeolite, or hydrotalcite, or a blend of zeolite and hydrotalcite, wherein the stucco comprises calcium sulfate hemihydrate and the one or more chloride salts, wherein the aqueous central core layer slurry is made from:
at least 60 wt. % said calcium sulfate hemihydrate on a dry (water free) basis,
150 to 4000 parts by weight chloride anion per 1,000,000 parts by weight said calcium sulfate hemihydrate, and
the water at a weight ratio of water to the calcium sulfate hemihydrate of 0.2:1 to 1.2:1; and wherein the aqueous central core layer slurry is made from:
at least 60 wt. % said calcium sulfate hemihydrate on a dry (water free) basis,
150 to 4000 parts by weight chloride anion per 1,000,000 parts by weight said calcium sulfate hemihydrate,
the salt absorbent material in an amount of 0.5 to 10 parts by weight per 100 parts by weight of the stucco for the first densified layer slurry, and
the water at a weight ratio of water to the calcium sulfate hemihydrate of 0.2:1 to 1.2:1, allowing the aqueous gypsum central core layer slurry to set to form a central core layer comprising calcium sulfate dihydrate, and allowing the aqueous gypsum first densified layer slurry to set to form a first densified layer comprising calcium sulfate dihydrate and the salt absorbent particles, to form a gypsum board preform comprising the central core layer, the first densified layer, the first cover sheet, and the second cover sheet;

cutting the gypsum board preform to produce the gypsum board; and drying the gypsum board;

wherein parts by weight of salt absorbent material per 100 parts by weight stucco in the aqueous central core layer slurry is relatively less than parts by weight of salt absorbent material per 100 parts by weight stucco in the aqueous first densified layer slurry, wherein parts by weight of salt absorbent material per 100 parts by weight set gypsum in the central core layer is relatively less than parts by weight of salt absorbent material per 100 parts by weight set gypsum in the first densified layer;

wherein the aqueous central core layer slurry is less dense than the aqueous first densified layer slurry;

wherein the core has a density of about 15 to 55 pounds per cubic foot, wherein the first densified layer has a density at least 1.1 times a density of the central core layer, wherein the first densified layer is thinner than the central core layer, and wherein thickness of the first densified layer is 5% to 25% of the thickness of the gypsum board;

wherein the central core layer has less than 0.01 wt. % zeolite and less than 0.01 wt. % hydrotalcite.

* * * * *